United States Patent [19]
Yang

[11] Patent Number: 5,228,999
[45] Date of Patent: Jul. 20, 1993

[54] METHOD AND APPARATUS FOR MAINTAINING AN ARTIFICIAL AQUATIC SYSTEM

[76] Inventor: Hyun W. Yang, 200 Bethyl Loop—Apt. 3H, Brooklyn, N.Y. 11239

[21] Appl. No.: 808,657

[22] Filed: Dec. 17, 1991

[51] Int. Cl.⁵ .................. A01K 63/04; B01D 36/02
[52] U.S. Cl. .................. 210/615; 210/631; 210/805; 210/169; 210/416.2; 210/258; 210/262; 119/5
[58] Field of Search ............ 210/169, 416.2, 256, 210/257.1, 258, 259, 262, 295, 601, 615, 620, 631, 767, 803, 621; 119/5

[56] References Cited

U.S. PATENT DOCUMENTS

| | | | |
|---|---|---|---|
| 546,883 | 9/1895 | Gunther | 210/169 |
| 893,625 | 7/1908 | Heuscher et al. | 210/169 |
| 1,634,305 | 7/1927 | Schrimp | 119/5 |
| 2,491,853 | 12/1949 | Feldman | 210/416.2 |
| 2,636,473 | 4/1953 | Schwartz et al. | 210/169 |
| 3,261,471 | 7/1966 | Halpert | 210/169 |
| 3,418,973 | 12/1968 | Saito | 210/169 |
| 3,540,593 | 11/1970 | Stewart | 210/169 |
| 3,661,262 | 5/1972 | Sanders | 210/169 |
| 3,722,685 | 3/1973 | Orensten et al. | 210/169 |
| 3,771,544 | 11/1973 | Horvath | 210/169 |
| 3,774,766 | 11/1973 | Brock | 210/169 |
| 3,785,342 | 1/1974 | Rogers | 119/5 |
| 4,035,298 | 7/1977 | Cloke et al. | 210/169 |
| 4,098,230 | 7/1978 | Jackson | 210/169 |
| 4,196,695 | 4/1980 | Zupo | 119/5 |
| 4,622,148 | 11/1986 | Willinger | 210/169 |
| 4,752,388 | 6/1988 | Ng | 210/169 |
| 4,807,565 | 2/1989 | Hawthorne | 119/5 |
| 4,936,981 | 6/1990 | Baisley et al. | 210/169 |
| 4,978,444 | 12/1990 | Rommel | 210/169 |
| 5,006,230 | 4/1991 | Votava, III | 210/416.2 |

FOREIGN PATENT DOCUMENTS

| | | |
|---|---|---|
| 190365 | 5/1906 | Fed. Rep. of Germany . |
| 934853 | 10/1955 | Fed. Rep. of Germany . |
| 2222505 | 11/1973 | Fed. Rep. of Germany . |
| 9014002 | 11/1990 | PCT Int'l Appl. . |

OTHER PUBLICATIONS 1990-1991 Catalog, "That Fish Place".

Primary Examiner—Stanley S. Silverman
Assistant Examiner—Christopher Upton
Attorney, Agent, or Firm—Eugene M. Lee

[57] ABSTRACT

A method and apparatus for maintaining an artificial aquatic environment for supporting aquatic organisms comprises forming a water tank with a water drain outlet located on a bottom of the water tank, providing a water filter means adjacent a water fill line of the water tank, the water filter means having a water containment housing with a water inlet and a water outlet, the water containment housing extending above and below the water line of the water tank, the water inlet being positioned higher than the water outlet, the water inlet being positioned at or below the water fill line of the water tank, a filter element removably positioned between the water inlet and the water outlet within the water containment housing, connecting the water drain outlet to the water filter means with a water drain conduit means such that the water filter means and the water tank have a common water line when the water tank is filled with water to the water fill line, providing a pumping means to pump water from the water filter means into the water tank through a water conduit means, and connecting the water outlet of the water filter means to the pumping means with a water return conduit means, whereby debris and waste together with water in the water tank are forced through the water drain outlet by water pressure within the tank and travels through the water drain conduit means to the water filter means where the water is filtered to remove the debris and waste and then pumped by pumping means back into the water tank through the water return conduit means.

12 Claims, 20 Drawing Sheets

METHOD AND APPARATUS FOR MAINTAINING AN ARTIFICIAL AQUATIC SYSTEM

BACKGROUND OF THE INVENTION

1. Field of the Invention

The present invention relates to a method and apparatus for maintaining an artificial aquatic system for supporting aquatic organisms.

2. Description of the Prior Art

Artificial aquatic systems such as aquarium tanks are well-known. Various artificial aquatic systems have been developed having so-called self-cleaning features. Such features include slanted bottoms for directing wastes towards a drain located at the end of the slant bottoms combined with perforated false bottoms above the slanted bottoms for selectively passing wastes, continuous filtration pumps located within the tank, as well as combination gravel bottom filtration systems. However, most of these systems employ elaborate filtration systems that suffer from lack of efficiency during operation resulting in the electrical water pumps used in these systems wearing out or becoming ineffective over time.

Other systems are simply too complicated and require expensive equipment to render them operational and are not commercially feasible to manufacture due to cost limitations. Other systems suffer from the fact that the filtration units employed are difficult to service in terms of replacing the filter elements.

Most, if not all, currently available self-cleaning aquarium systems are mechanically complex. Not only do they pose manufacturing and production problems, but they also suffer from intensive maintenance requirements. Thus, currently available self-cleaning aquarium systems require a high initial investment cost with continued high cost of maintenance.

Another drawback of currently available self-cleaning aquarium systems is that the configuration of the filtration systems employed in such aquarium systems imposes a limitation and restriction on the size of the aquarium tank. As such, large aquarium tanks either cannot be effectively cleaned or require modifications or multiple filtration units in order to effectively clean the vast quantities of water.

Accordingly, although there is a need for self-cleaning aquariums that are simple in design, easy to maintain, economic in terms of initial investment and continued maintenance, and not limited in size due to the configuration of the filtration system employed, presently available systems cannot fulfill such demands.

Of the current filtration systems that are available, most if not all are either ineffective in filtering any significant amount of water or are too complex and expensive. Additionally, the configuration of most current filtration systems require the disassembly of the filtration unit in order to change the filter element. Furthermore, the configuration of the various filters used in these filtration systems are such that there is no flexibility in terms of the filter media that can be used, i.e., the filter elements are not interchangeable between different filtration units. Moreover, most current filtration systems require pumps that have enough power to pump water from an aquarium tank, through a filter unit and back into the aquarium tank. Accordingly, for large aquarium tanks, large and powerful pumps are required in order to effect a sufficient rate of water flow through the filter unit in order to effectively filter and clean the water within the aquarium tank. The mechanical stress on pump units used in such filtration units due to back pressure from the tank and head pressure from the filtration unit and water line feeding back to the aquarium tank causes the motor in the pump units to wear out fairly quickly.

Accordingly, there is a need for a filtration system for an aquarium tank that answers to the drawbacks and disadvantages of the prior art filtration systems. There is also a need for a filtration system that can be easily adapted to fit any size aquarium tank and which is effective in filtering and cleaning the water in the aquarium tank without the costs and disadvantages associated with the prior art filtration systems. Moreover, there is a need for an effective filtration system for an aquarium tank that can accept a wide range of readily available and relatively cheap filter media and which can be used in conjunction with a relatively small water pump unit without sacrificing fast and efficient filtration and cleaning of water in the aquarium tank.

SUMMARY OF THE INVENTION

The present invention is directed to a novel method and apparatus for maintaining an artificial aquatic system featuring a self-cleaning aquarium tank that provides optimum aquatic conditions for supporting aquatic organisms. The present invention also provides a novel method and apparatus for providing an artificial aquatic environment that simulates conditions of a clean, natural aquatic system. The present invention may be used in conjunction with either fresh water or salt water systems. The present invention does not limit the size of the aquarium tank and does not require complex filtration systems.

The present invention is also directed to a novel method and apparatus for filtering the water in an aquarium tank. More specifically, the present invention also includes a novel filtration method and apparatus than can be easily used in aquarium tanks of any size and shape or configuration and which does not require large and powerful pumping units. The method and apparatus of the invention does not require special filter media such as filter cartridges and the like and can take nearly any type of filter media.

The present invention represents a vast improvement and a completely novel approach for satisfying and meeting the needs, requirements and criteria for effective and useful maintenance of an artificial aquatic environment for supporting aquatic life without the problems and disadvantages of the prior art methods, apparatus and systems in a simple, safe and cost effective manner.

The present invention is directed particularly to a method and apparatus for maintaining a clean aquatic environment for aquatic organisms such as fish and other marine life in a surprisingly simple and cost effective manner requiring minimal maintenance.

The present invention is further directed to a novel filtration system that is adaptable to any size aquarium and configuration, uses a wide range of readily available and cheap filter media, and which does not require a powerful pump unit.

Accordingly, an advantage of the present invention is the provision of an artificial aquatic system that affords optimum aquatic environment conditions for maintaining aquatic organisms.

Another advantage of the present invention is the provision of an artificial aquatic system that is virtually maintenance free.

Yet another advantage of the present invention is the provision of an artificial aquatic system that affords the simulation of natural aquatic systems.

Still another advantage of the present invention stems from the absence of any limitation on the size or configuration of the aquarium tank that can be used in connection with the present invention, thus allowing extra large and creative configurations in aquarium tank design to be possible without the fear of not being able to effectively filter and clean the water within the aquarium tank.

These and additional objects and advantages of the invention will be set forth, in part, in the description which follows and, in part, will be obvious from the description or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a preferred embodiment of the present method for maintaining an artificial aquatic environment for supporting aquatic organisms comprises forming a water tank having a water drain outlet on a bottom wall of the water tank, providing a water filter means adjacent a water fill line of the water tank, the water filter means having a water containment housing with a water inlet and a water outlet, the water containment housing extending above and below the water line of the water tank, the water inlet being positioned higher than the water outlet, the water inlet being positioned at or below the water fill line of the water tank, a filter element removably positioned between the water inlet and the water outlet within the water containment housing, connecting the water drain outlet to the water filter means with a water drain conduit means such that the water filter means and the water tank have a common water line when the water tank is filled with water to the water fill line, providing a pumping means to pump water from the water filter means into the water tank through a water return conduit means, and connecting the water outlet of the water filter means to the pumping means with a water conduit means, whereby debris and waste in the water tank together with water in the water tank are forced through the water drain outlet by water pressure within the tank and travels through the water drain conduit means to the water filter means where the water is filtered to remove the debris and waste and then pumped by pumping means back into the water tank through the water return conduit means.

Preferably, the water tank is formed with a slanted bottom and the water drain outlet is located at a lower end of the slanted bottom such that debris and waste in the water tank are urged down the slanted bottom of the water tank toward the water drain outlet and together with water in the water tank forced through the water drain outlet by water pressure within the tank. The water filter means may be provided either exterior of the water tank or within the interior of the water tank. The filter element is preferably removably contained in a removable filter element housing within the water containment housing. The method of the present invention may further comprise providing a biological filter means between the pumping means and the water tank. The biological filter means is preferably provided above the water tank.

A preferred aquarium system or apparatus of the present invention for maintaining an artificial aquatic environment for supporting aquatic organisms comprises a water tank having a water drain outlet located on a bottom wall of the water tank, a water filter means adjacent a water fill line of the water tank and having a water containment housing with a water inlet and a water outlet, the water containment housing extending above and below the water line of the water tank, the water inlet being positioned higher than the water outlet, the water inlet being positioned at or below the water fill line of the water tank, a filter element removably positioned between the water inlet and the water outlet within the water containment housing, a water drain conduit means connecting the water drain outlet to the water inlet of the water containment housing such that the water filter means and the water tank have a common water line when the water tank is filled with water to the water fill line, a water pumping means, a water conduit means connecting the water outlet of the water containment housing to the water pumping means, and a water return conduit means connecting the water pumping means to the water tank.

Preferably the water tank is formed with a slanted bottom and the water drain outlet is located at a lower end of the slanted bottom. The water filter means may be provided either exterior of the water tank or within the interior of the water tank. Preferably, the filter element is removably contained in a removable filter element housing inside the water containment housing. The aquarium system of the present invention may further comprise a biological filter means having a water inlet and a water outlet, the water inlet being connected by second water conduit means to the water pumping means with the water outlet communicating with the water tank. The biological filter unit is preferably positioned above the water tank.

In an alternate embodiment of the present invention, there is provided an aquarium system comprising a water tank having a water drain outlet located on a bottom wall of the water tank, a water filter means, a water drain conduit connecting the water drain outlet to the water filter means, a water pumping means, a first water conduit means connecting the water filter the water pumping means, a biological filter means, a second water conduit means connecting the water pumping means to the biological filter means, a water return conduit means for returning water from the biological filter means to the water tank, wherein the water tank and the water filter means have a common water line.

The present invention is also directed to a biological filter apparatus for filtering water in an aquarium comprising a biological filter unit having a water inlet and a water outlet, and having water containment walls forming a water passageway that is open to the air between the water inlet and water outlet.

In another aspect of the present invention, there is provided a biological filter apparatus for filtering water in an aquarium tank comprising a plurality of biological filter units, at least one water inlet and at least one water outlet operatively associated with the plurality of biological filter units, wherein water in the aquarium is pumped through the water inlet in one biological filter unit and flows back into the aquarium tank through a water outlet of another biological filter unit. The plurality of biological filter units may comprise an upper biological filter unit having a water inlet and a water outlet and a lower biological filter unit having water passageways for receiving and channeling water from the upper biological filter unit and a water outlet, wherein water in an aquarium tank is pumped through the water inlet of the upper filter unit and flows back into the aquarium tank through the water outlet of the lower filter unit. An intermediate filter unit having water passageways for receiving and channeling water from the upper filter unit and a water outlet may be provided between the upper biological filter unit and the lower biological filter unit.

In another aspect of the present invention, there is also provided a water filter system for an aquarium comprising a water containment housing mountable on a wall of the aquarium, inside the aquarium, a water pumping means mountable on a wall of the aquarium, outside the aquarium, and a water drain conduit having a predetermined length, wherein the water containment housing has a water inlet and a water outlet, the water inlet being positioned above the water outlet with a filter element removably positioned between the water inlet and the water outlet within the water containment housing, the water drain conduit having a predetermined length communicating with the water inlet and extending downwardly towards a bottom of the aquarium and ending at a water intake just above the bottom of the aquarium, the water outlet of the water containment housing communicating with the water pumping means by a water conduit means, the water pumping means having a water return conduit means for pumping water into the aquarium, and wherein the water containment housing is adjacent a water fill line of the aquarium, and the water inlet is at or below the water fill line of the aquarium.

Preferably, the length of the water drain conduit is adjustable to the depth of the aquarium. It is also preferable to have the filter element removably contained in a removable filter element housing.

The present invention further provides for a water filter system for an aquarium comprising a water containment housing mountable on a wall of the aquarium, inside the aquarium, a water pumping means mountable on a wall of the aquarium, outside the aquarium, a biological filter unit mountable on a wall of the aquarium, above the aquarium, and having a water inlet and a water outlet, and a water drain conduit having a predetermined length, wherein the water containment housing has a water inlet and a water outlet, the water inlet being positioned above the water outlet with a filter element removably positioned between the water inlet and the water outlet within the water containment housing, the water drain conduit having a predetermined length communicating with the water inlet and extending downwardly towards a bottom of the aquarium and ending at a water intake just above the bottom of the aquarium, the water outlet of the water containment housing communicating with the water pumping means by a water conduit means, the water pumping means having a second water conduit means communicating with the water inlet of the biological filter unit, the water outlet of the biological filter unit returning water into the aquarium, and wherein the water containment housing is adjacent a water fill line of the aquarium, and the water inlet is at or below the water fill line of the aquarium.

It is preferable to position the water outlet of the biological filter unit distant to the water intake of the water drain conduit in order to effect a cyclic water flow pattern within the aquarium tank. The biological filter unit may also be adapted to serve as a housing for a light source.

The present invention avoids the disadvantages and drawbacks of the prior art by eliminating the need for complicated, costly and inefficient filtration systems. The present invention embodies a further advantage in that the water of the aquatic system does not require changing. The method and apparatus of the present invention further provides an effective self cleaning feature together with a highly effective and simple filtration means that minimizes maintenance. In an alternate embodiment of the present invention there is also provided an effective biological filtration means that is virtually maintenance free and which removes biological contaminants such as algae and organic toxins from the aquarium tank water.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
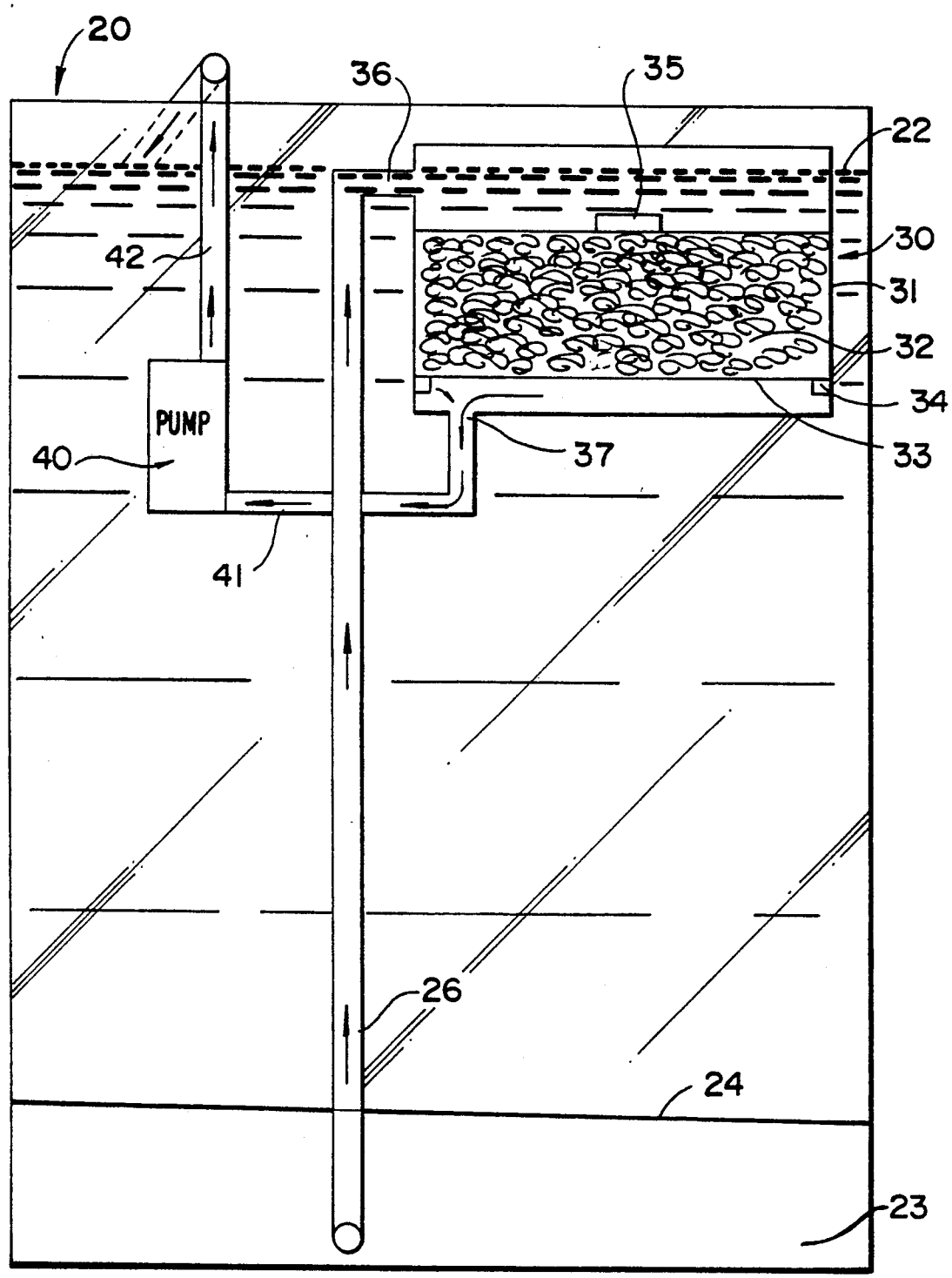
FIG. 1 is a rear, elevational, schematic diagram illustrating an aquatic system of the present invention.

Reference will now be made in detail to preferred embodiments of the invention, examples of which are illustrated in the accompanying drawings. Wherever possible, the same reference numbers will be used throughout the drawings to refer to the same or like parts.

Referring to the drawing figures, an aquarium tank 20 is formed having a slanted bottom 23 with a water drain outlet 21. The aquarium tank may optionally be formed with a flat, horizontal bottom, i.e., without a slanted bottom. The water drain outlet 21 is located at a lower end 25 of the slanted bottom 23. A filter means 30 having a water inlet 36 and a water outlet 37 is provided adjacent a water fill line 22 of the aquarium tank 20. A water drain conduit means 26 connects the water drain outlet 21 to the water inlet 36 of the filter means 30. A water pumping means 40 is provided adjacent the water filter means 30. A water conduit means 41 connects the water outlet 37 of the filter means 30 to the water pumping means 40. A water return conduit means 42 is connected to the pumping means 40 and allows water from the pumping means 40 to be channeled back into the aquarium tank 20.

When the aquarium tank 20 is filled with water to the water fill line 22, the water drain conduit means 26 also becomes filled with water to the water fill line 22 by virtue of the existing water pressure within the aquarium tank 20, i.e., water passes through the water drain outlet 21 and fills the water drain conduit means 26 as the aquarium tank 20 is filled with water. As the water level within the aquarium tank 20 rises toward the water fill line 22, the filter means 30 also becomes filled with water to the water fill line 22. As the filter means 30 becomes filled with water, water also passes through the water outlet 37 of the filter means 30, through the water conduit means 41, through the water pumping means 40, and fills the water return conduit means 42 up to the water fill line 22.

When the water pumping means 40 is activated, the water pumping means 40 pumps water through the water return conduit means 42 past the fill line 22, and the water is pumped and channeled through he water return conduit means 42 into the aquarium tank 20. As the water pumping means 40 pumps water into the aquarium tank 20, a negative pressure develops within the water conduit means 41 between the filter means 30 and the water pumping means 40, and water is actively sucked out of the filter means 30 through the water outlet 37 and through the water conduit means 41. As water within the filter means 30 flows out through the water outlet 37, the natural water pressure within the aquarium tank 20 forces water through the water drain outlet 21, through the water drain conduit 26, and into the filter means 30 to maintain the natural common water fill line 22. Water entering the water filter means 30 is filtered by a filter element 32 before passing through the water outlet 37. In this manner, a water flow pattern is achieved.

Figure 2:
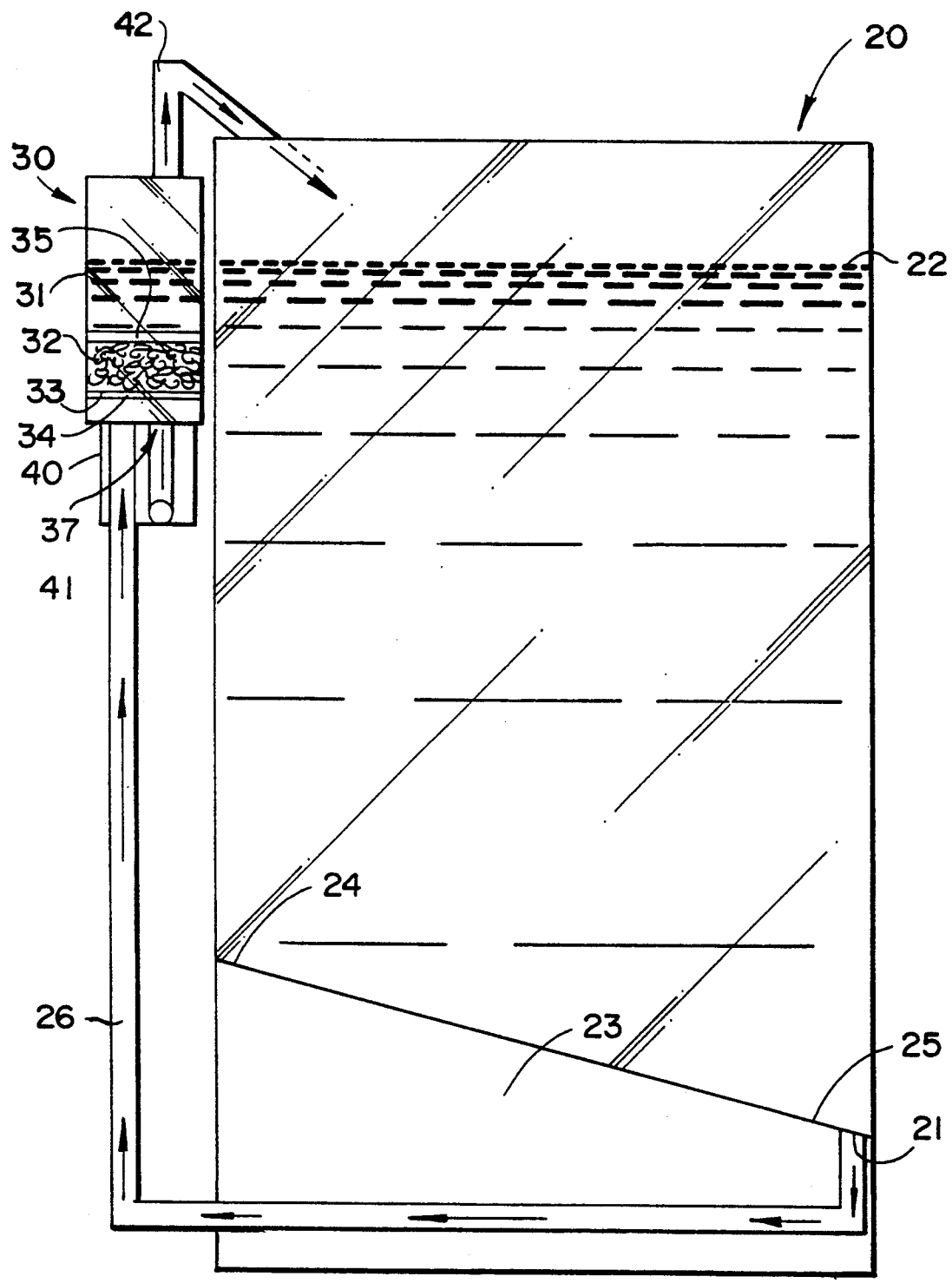
FIG. 2 is a side, elevational, schematic diagram of the aquatic system shown in FIG. 1.
Figure 3:
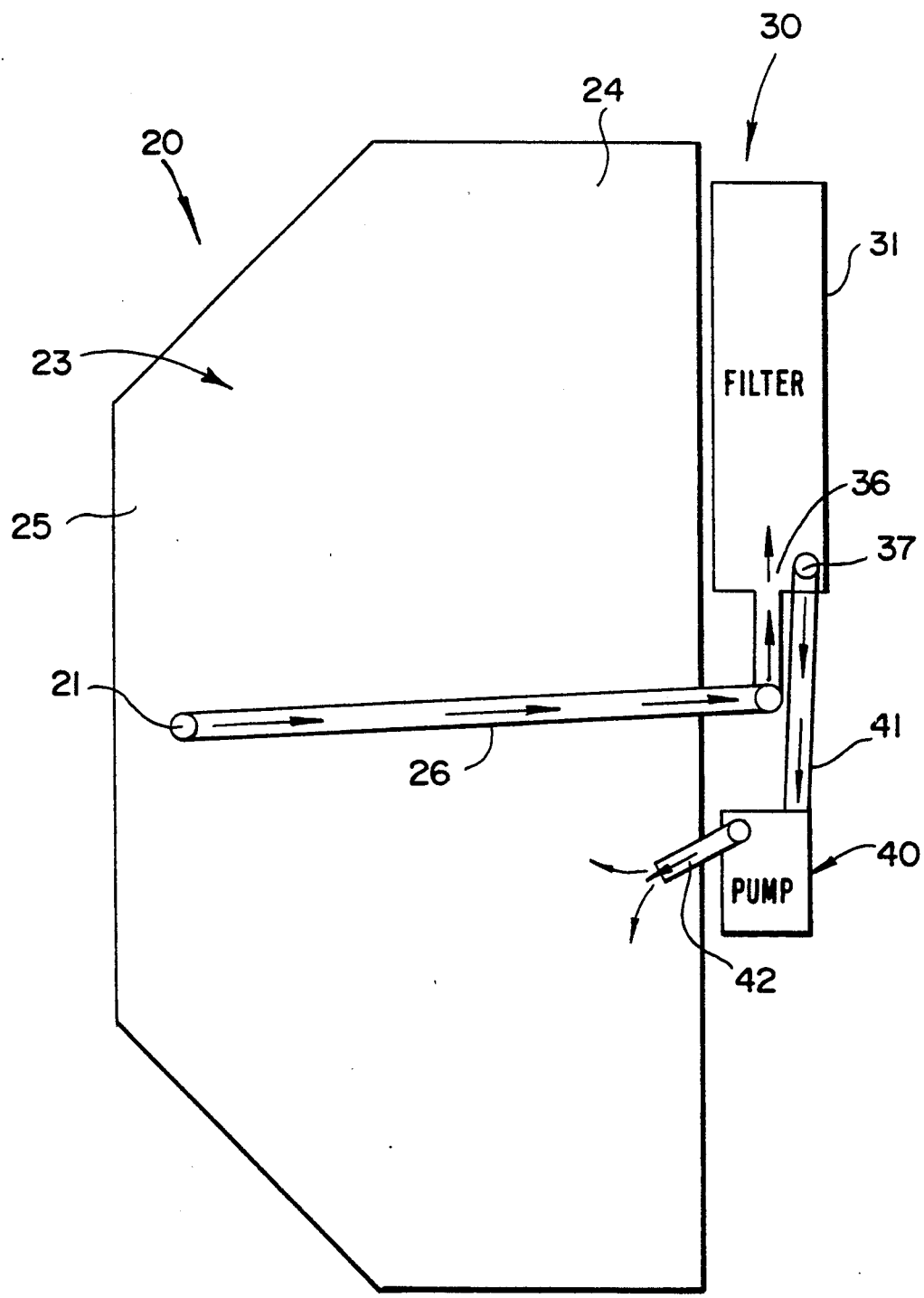
FIG. 3 is a top, schematic diagram of the aquatic system shown in FIG. 1.

The water drain conduit means 26 may be in the form of a pipe (e.g., polyvinyl chloride, PCV, piping), tubing or a channel housing. In the schematic drawings of FIGS. 1 and 2, water drain conduit means 26 may comprise a first PVC pipe having one end operatively connected to the water drain outlet 21 by means of a connector fitting (not shown) and having the other end operatively connected to a second PCV pipe by means of an L-shaped fitting (not shown). The PVC pipes can just as easily be in the form of flexible plastic tubing.

An alternate embodiment of the water drain conduit 26 is shown in the schematic drawings of FIGS. 5-8 wherein the water drain conduit means 26 comprises a channel made of plexiglass that is integrally attached to the aquarium tank 20 by means of a cement compound. While the bonding of plexiglass using cement compounds is well-known, it is important to use non-toxic cementing compounds. The channel encompasses the water drain outlet 21 and extends integrally therefrom, exterior of the bottom 23 of the aquarium tank 20, to the rear of the aquarium tank 20 where it continues laterally, exterior of the aquarium tank 20, then upwardly, either exterior or interior to the aquatic tank, towards the top of the aquarium tank to communicate with the water inlet 36 of the filter means 30. If the channel is made to extend upwardly, within the interior of the aquarium tank 20, the filter means 30 is also provided within the interior of the aquarium tank. If the channel is made to extend upwardly, exterior of the aquarium tank 20, the filter means 30 is also provided exterior of the aquarium tank.

Referring to FIGS. 5-8, filter means 30 comprises a water containment housing 31 having a water inlet 36 and a water outlet 37, and a removable filter element housing 33 disposed within the water containment housing 31 between the water inlet 36 and the water outlet 37. In the embodiment shown in the drawings, the inlet 36 is in the form of a lowered wall portion between the containment housing and the water return conduit 26.

The removable filter element housing 33 is supported within the water containment housing 31 by filter element housing supports 34. The supports 34 allow the removable filter element housing 33 to rest at an intermediate level within the water containment housing 31 such that a layer of water exists both above and below the filter element housing 33. While it is not critical where the filter element housing 33 is located within the water containment housing 31, it is critical that the filter element housing 33 be positioned between the water inlet 36 and the water outlet 37.

The top of the water containment housing 31 of the filter means 30 may be covered or open, and in a preferred embodiment, the top of the water containment housing 31 of the filter means 30 is simply left open to allow easy access to the removable filter element housing 33.

The filter element housing 33 is simple in construction and comprises a box-like structure having four sides, a perforated bottom, and a handle 35. The filter element housing may be made using plexiglass, acrylic sheet material, plastic boards and like material so long as it is sturdy and non-toxic. While a box-like structure is shown in the drawings in accordance with preferred embodiments of the present invention, it is to be understood that the configuration of the filter element housing 33 can be adapted to almost any shape.

Accordingly, the water containment housing 31 can also be adapted or formed into a desired configuration provided the filter element housing 33 is also adapted to fit within the configuration of the water containment housing 31 and be readily removable and replaceable by sliding the filter element housing 33 up and down with the aid of the filter element housing handle 35. The perforated bottom (not shown) of the filter element housing 33 may be made by placing a plurality of uniformly spaced holes within the bottom wall or by using a mesh screen attached to the bottom edges of the sides of the filter element housing 33.

The filter element 32 may be in the form of a synthetic fiber floss material or simply wads of cotton. A charcoal impregnated pad (not shown) may optionally be used under the fiber floss material. When the filter element 32 becomes dirty as waste and debris accumulate on the filter element 32, the entire filter element housing may be readily removed, and the filter element 32 may be either rinsed clean or replaced using new filter material. This operation of removing the filter element housing 33 from the water containment housing 31 and cleaning or replacing the filter element 32 is simple and requires a minimal amount of time investment.

The water containment housing 31 is provided adjacent the water fill line 22 such that the housing 31 extends above and below the water fill line 22. As noted previously, the water containment housing 31 may be provided either exterior to or within the interior of the aquarium tank 20. It is important that the water inlet 36 of the filter means be also located adjacent the water fill line 22 of the aquarium tank 20. In the embodiment shown in FIGS. 1-4 and in the embodiment shown in FIGS. 5-8, the height of the water inlet 36 is such as to allow a variance in the water fill line 22 due to evaporation of the water in the aquarium tank 20. The amount of variance or tolerance in the water fill line 22 should be sufficient to avoid undue frequency in the need for adding water to the aquarium tank 20. Should evaporation of the water in the aquarium tank 20 lower the water fill line 22 to a level below the height at which water enters the water containment housing 31 of the filter means 30 through the water inlet 36, the water flow pattern will be broken and therefore water filtration will cease until water is added to the aquarium tank 20 to raise the water fill line 22 to a level sufficient to allow water to pass through the water inlet 36 into the water containment housing 31.

As described previously, in the embodiment shown in FIGS. 5-8, the water inlet 36 is formed integrally between the water drain conduit means 26 and a side wall of the water containment housing 31 by a common side wall section that has a height that is lower than the height of the walls of the water containment housing 31. The lower height of the common side wall section allows water to simply flow from the water drain conduit means 26 directly into the water containment housing 31. In the embodiment shown in FIGS. 5-8, it is important that the water fill line 22 be higher than the height of the lower common side wall section to avoid breaking the water flow pattern.

Water pumping means 40 is a commonly available aquarium water pump. Currently available water pumps have a pumping capacity ranging between 80 gallons per hour to over 2000 gallons per hour. According to the invention, the placement of the pumping means 40 adjacent to the water containment housing 31 allows a pumping efficiency that is significantly greater than the pumping efficiency of a pump located at the traditional location near the bottom of the aquarium tank, e.g., more than four (4) times greater efficiency. The greater efficiency puts less strain on the pumping means 40 resulting in longer life and a water volume throughput that closely conforms to the rated volume throughput of the pump. Moreover, the greater efficiency allows the use of a pump having a significantly lower water volume throughput without sacrificing the same water volume throughput as a pump having a higher water volume throughput rating but which is located adjacent the bottom of the aquarium tank 20.

Water conduit means 41 and water return conduit means 42 may also be in the form of PVC pipes or flexible plastic tubing and like conduits operatively connected to their respective inlet and outlet by simply sliding them over male inlet and outlet fittings with a tight fit and a tube clamp or by using connectors such as flexible plastic tubing.

Figure 4:
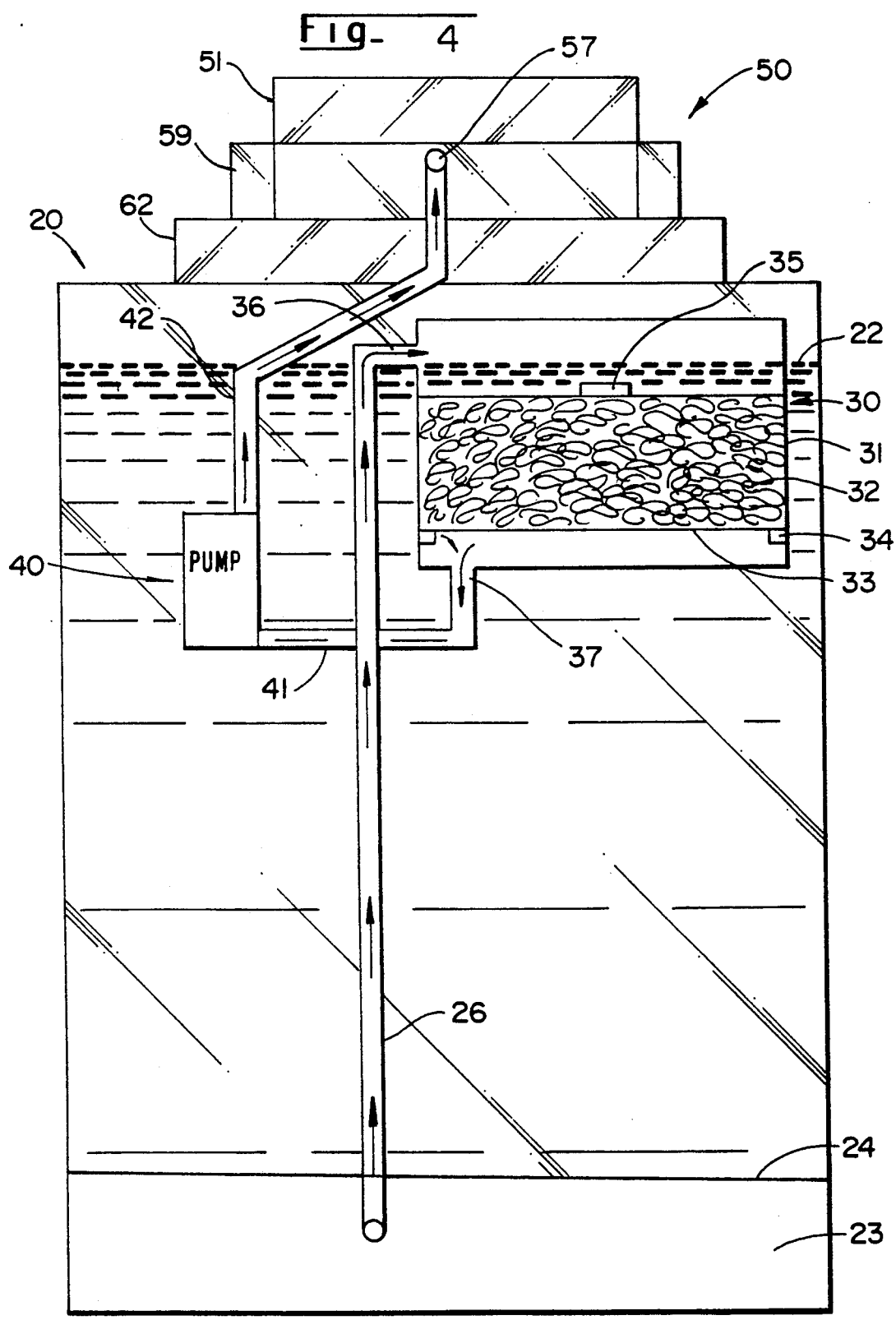
FIG. 4 is a rear, elevational, schematic diagram of the aquatic system shown in FIGS. 1-3 having a biological filtration means located on top of the aquarium tank.
Figure 5:
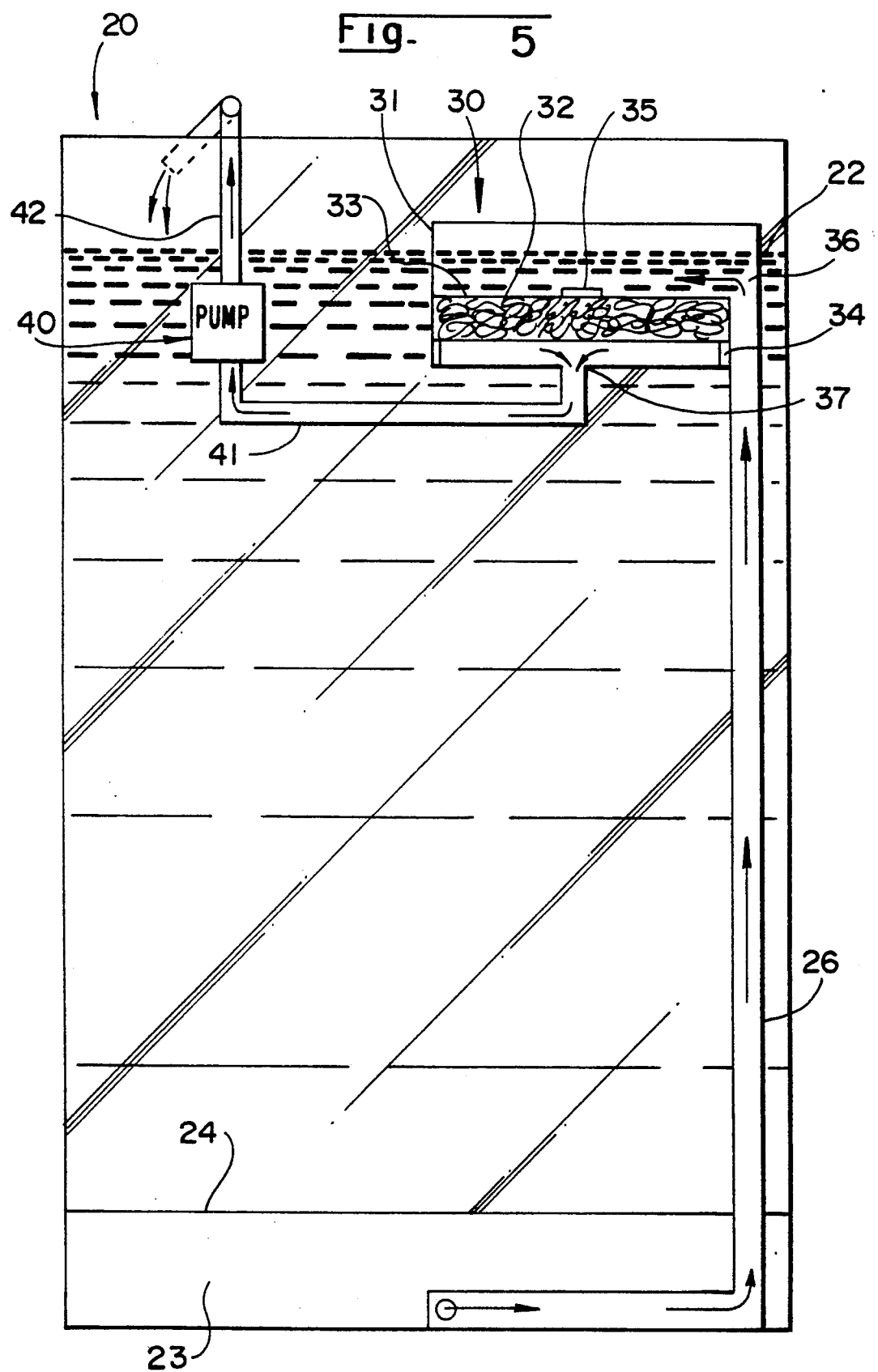
FIG. 5 is a rear, elevational, schematic diagram of an alternate aquatic system according to the present invention.
Figure 6:
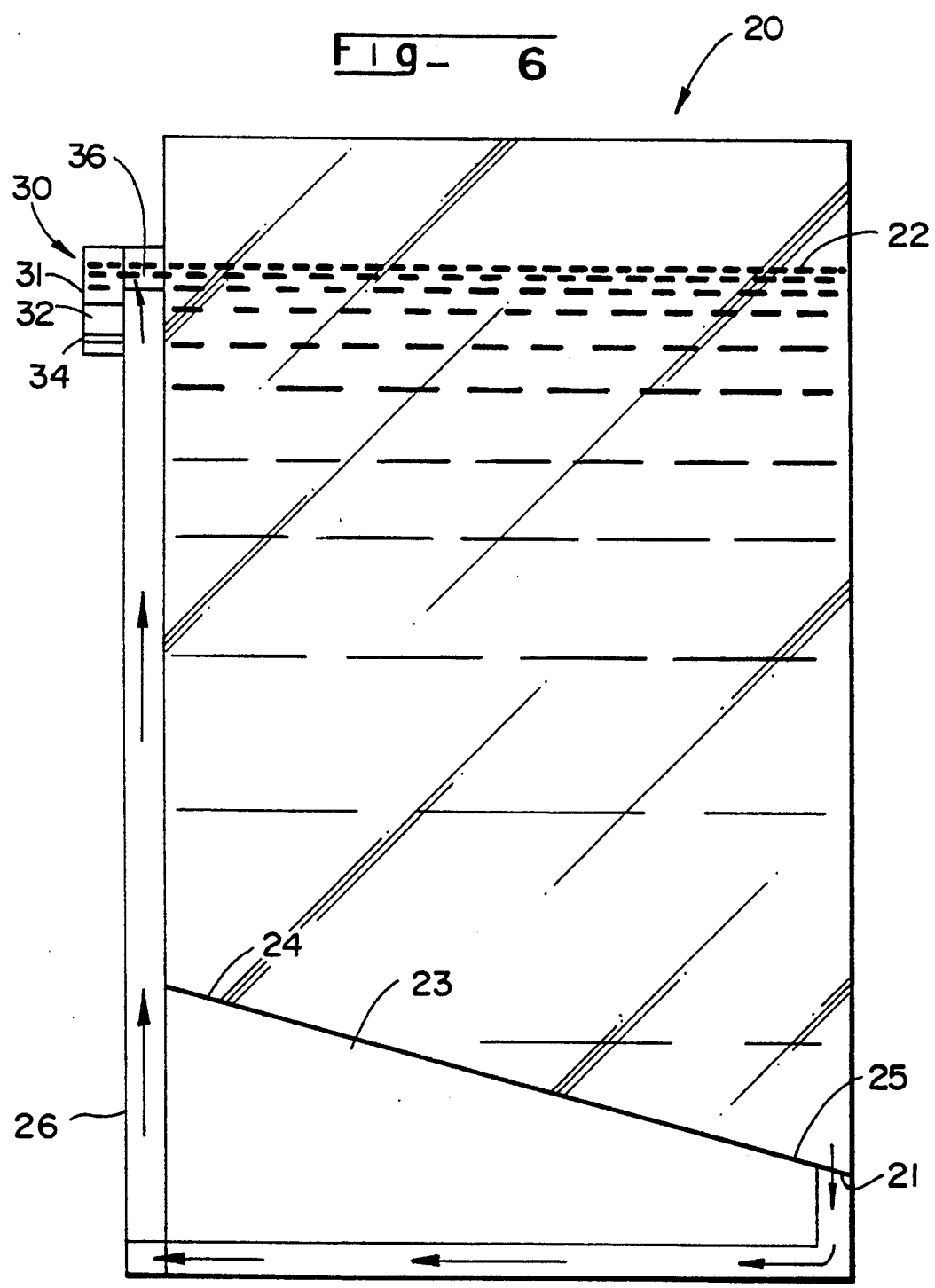
FIG. 6 is a side, elevational, schematic diagram of the aquatic system shown in FIG. 5.
Figure 7:
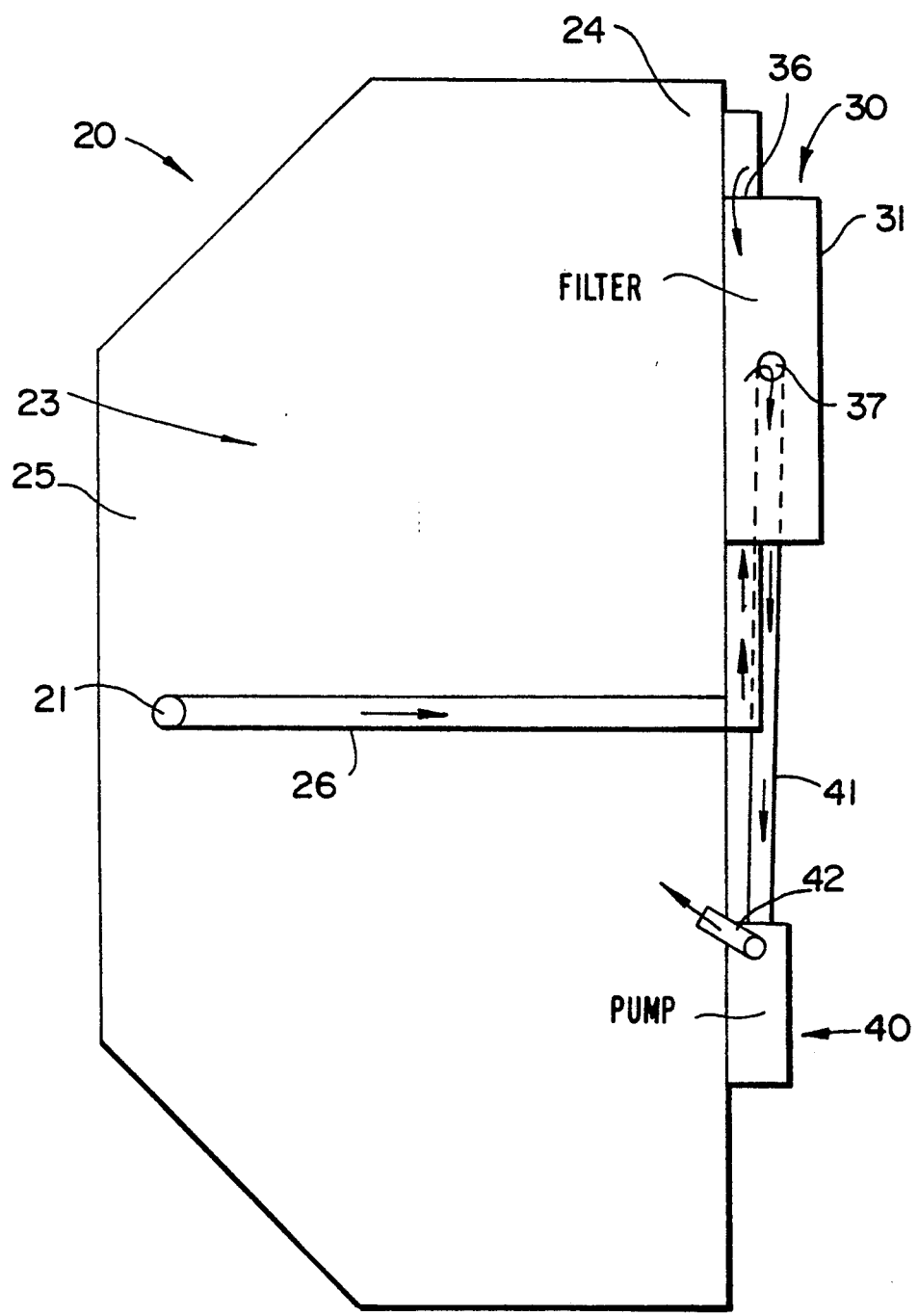
FIG. 7 is a top, schematic diagram of the aquatic system shown in FIGS. 5-6.
Figure 8:
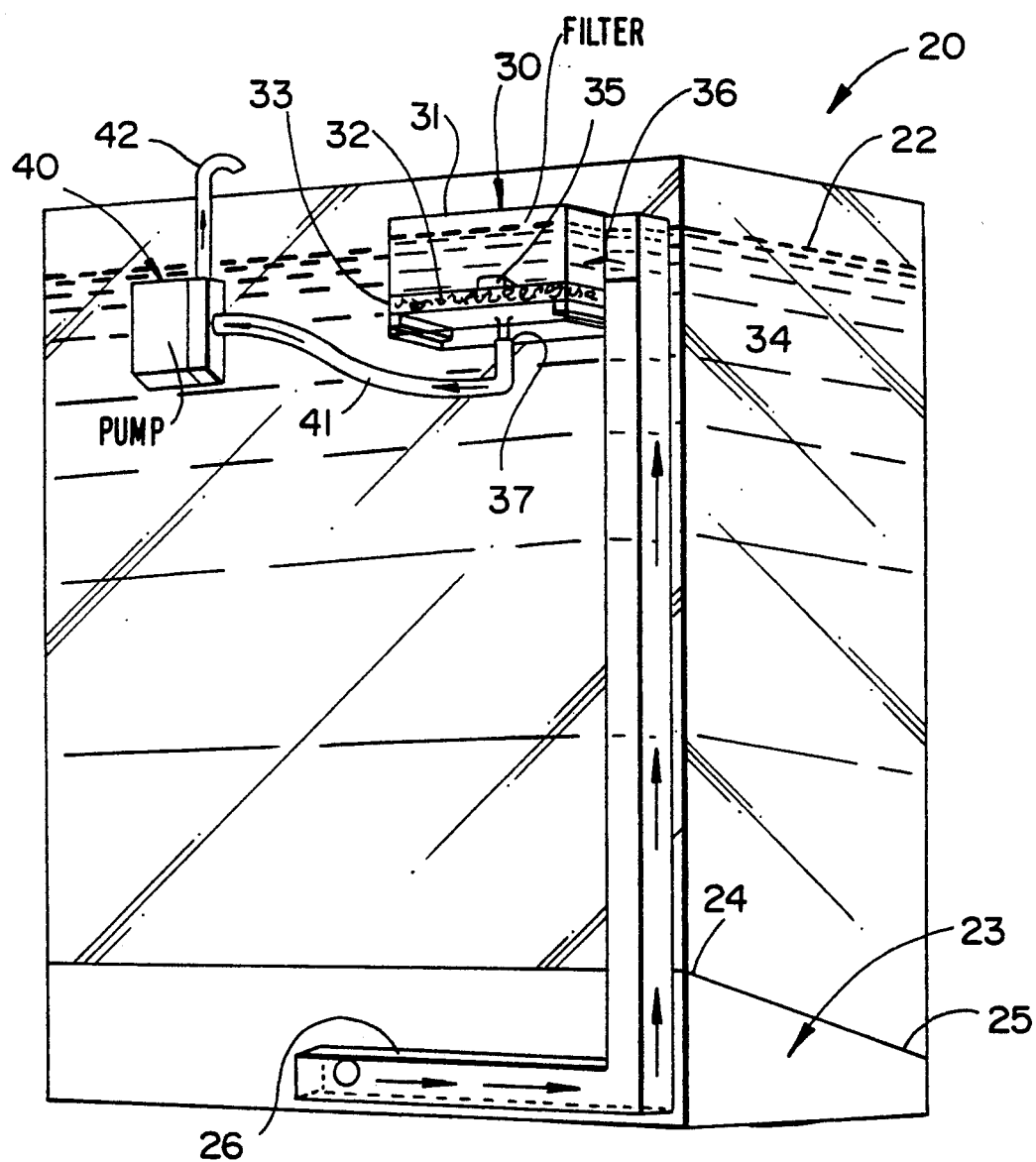
FIG. 8 is a schematic diagram in perspective of the aquatic system shown in FIGS. 5-7.

A preferred biological filter means 50 is shown in operational configuration in FIG. 4 mounted atop an aquarium tank 20. Referring to FIGS. 4 and 9-13, a preferred embodiment of the biological filter means 50 will now be described.

The biological filter unit 50 is comprised of a multiple of biological filtration units with three units 51, 59 and 62 being shown in the preferred embodiment. The upper filtration unit 51 is, in its simplest form, simply another form of the water containment housing 31.

Figure 9:
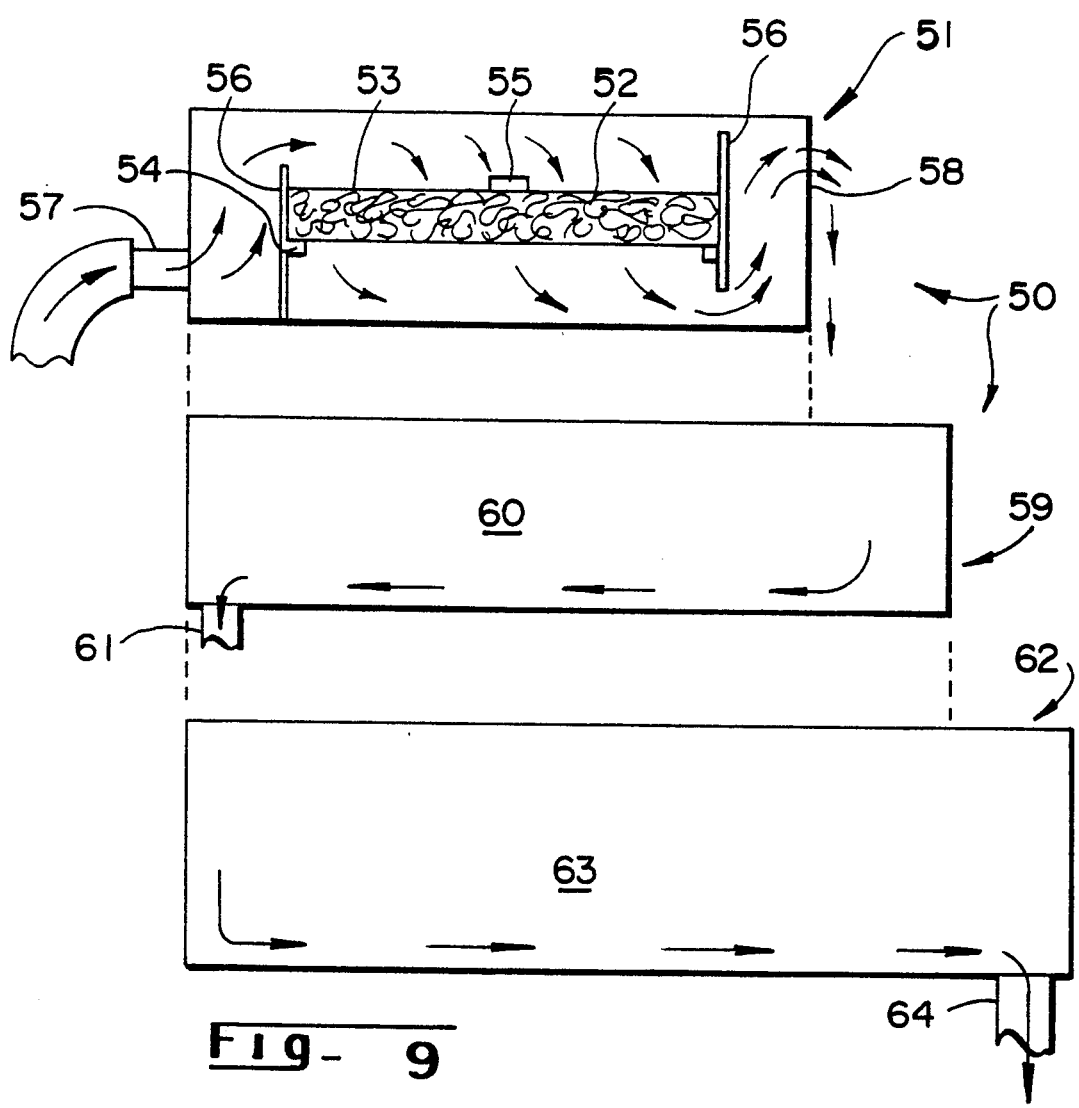
FIG. 9 is an exploded, side, elevational, schematic diagram of a biological filtration means of the present invention.
Figure 10:
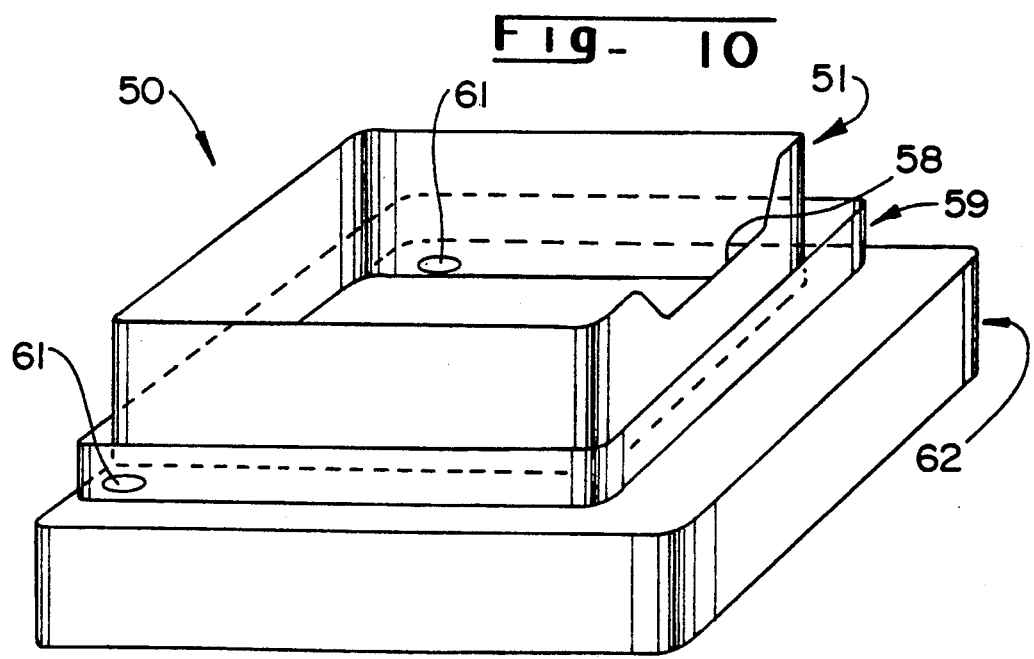
FIG. 10 is a schematic diagram in perspective of the biological filtration means shown in FIG. 9.

As seen in FIG. 9, the water return conduit means 42, instead of returning directly into the aquarium tank 20, is connected to a water inlet 57 of the filtration unit 51. Water entering the filtration unit 51 is guided over a water containment wall 56 and is passed through a filter element 52 that is contained within a removable filter element housing 53. The removable filter element housing 53 rests upon filter element housing supports 54 that are located on the water containment walls 56. The filter element housing 53 extends across the entire expanse within the two side walls of the upper filtration unit and the two water containment walls 56. A filter element housing handle 55 provides a grip to pull and slide the filter element housing 53 in order that the filter element 52 may be rinsed clean or replaced. The construction of the filter element housing 53 closely conforms to the construction of the filter element housing 33.

A second water containment wall 56 is placed higher than the first water containment wall 56 and prevents the water from flowing over the second containment wall 56 and thereby directs the water flow through the filter element 52. After the water passes through the filter element 52, the water is guided under the second containment wall 56 and over a water fall lip 58 formed on the far wall of the first filter unit 51 away from the water inlet 57.

The water flows over the water fall lip 58 and is directed onto an intermediate filter unit 59. The walls of the intermediate filter unit 59 form a water passageway 60 that direct the water bi-laterally and then towards the rearward direction. At the end of the water passageway 60 on both sides of the intermediate filter unit 59, a water outlet 61 allows the water to fall onto a lower filter unit 62. The walls of the lower filter unit 62 form a water passageway 63 that directs the water forwardly from both sides of the lower filter unit 62 and then laterally towards the middle of the passageway 63 towards a water outlet 64. Water flowing out of the water outlet 64 flows directly into the aquarium tank 20. The walls of the lower filter unit 62 may also form a housing for a light source by providing a hollow space where a light source fixture may be safely housed.

Figure 11:
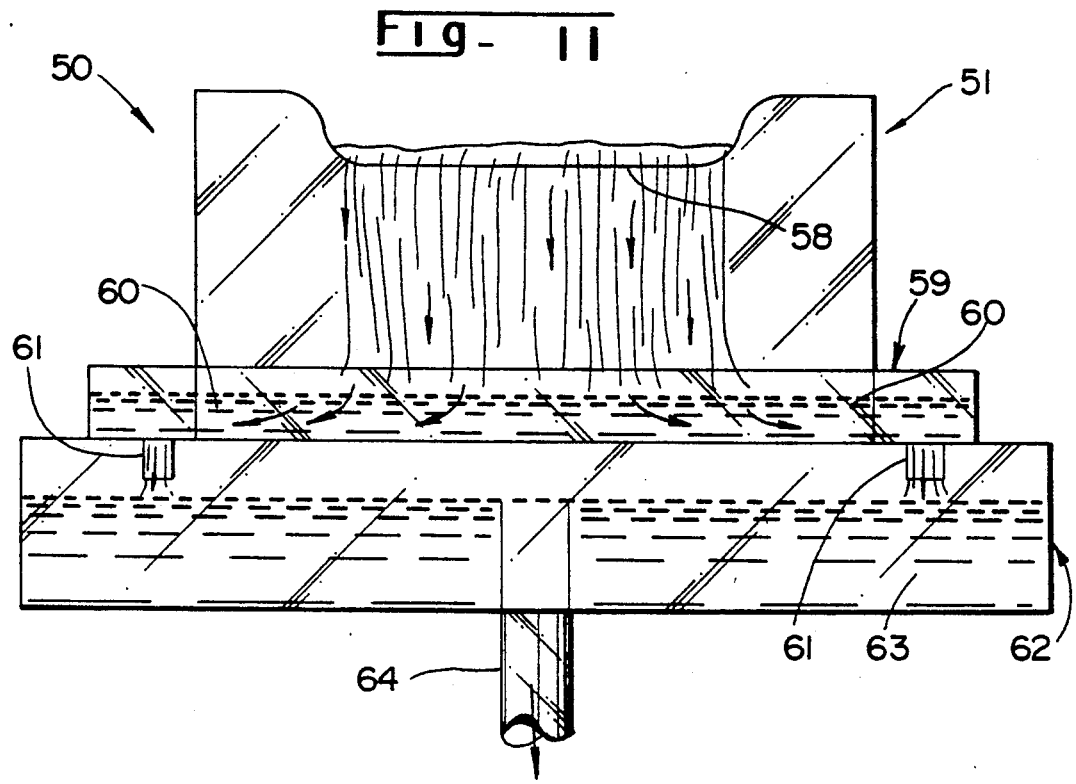
FIG. 11 is a front, elevational, schematic diagram of the biological filtration means shown in FIGS. 9 and 10.
Figure 12:
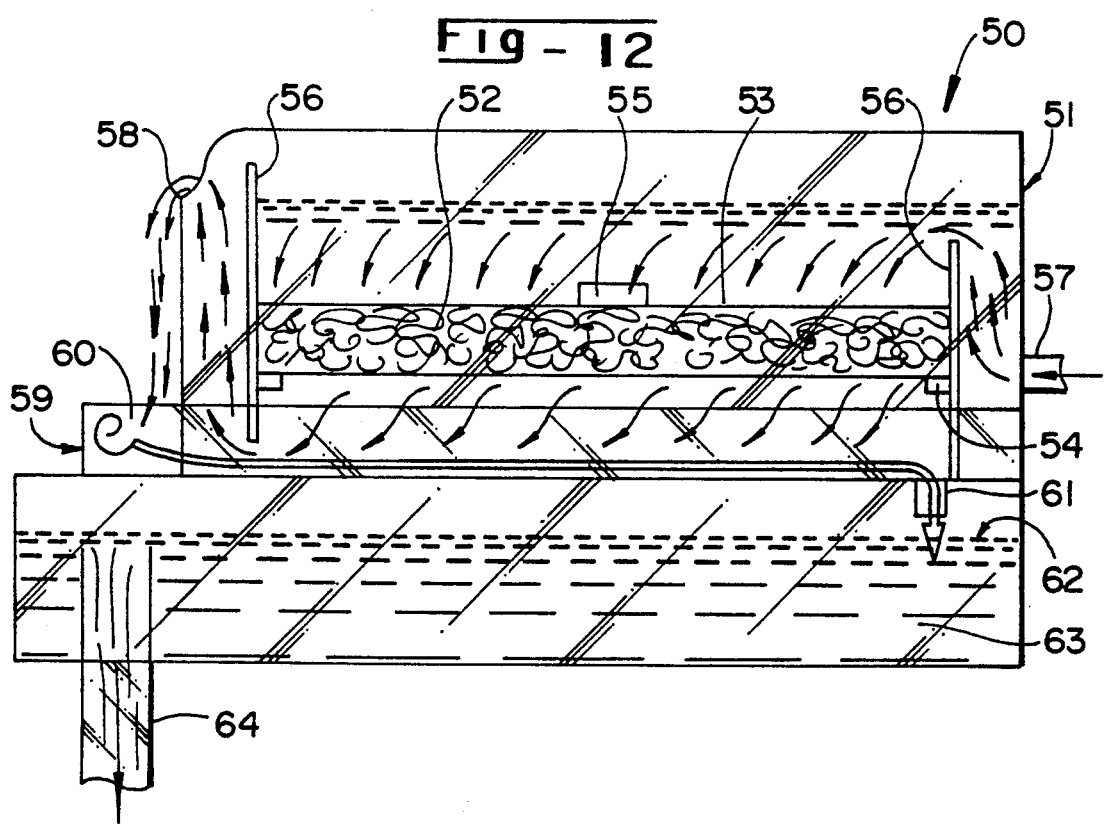
FIG. 12 is a side, elevational, schematic diagram of the biological filtration means shown in FIGS. 9-11.
Figure 13:
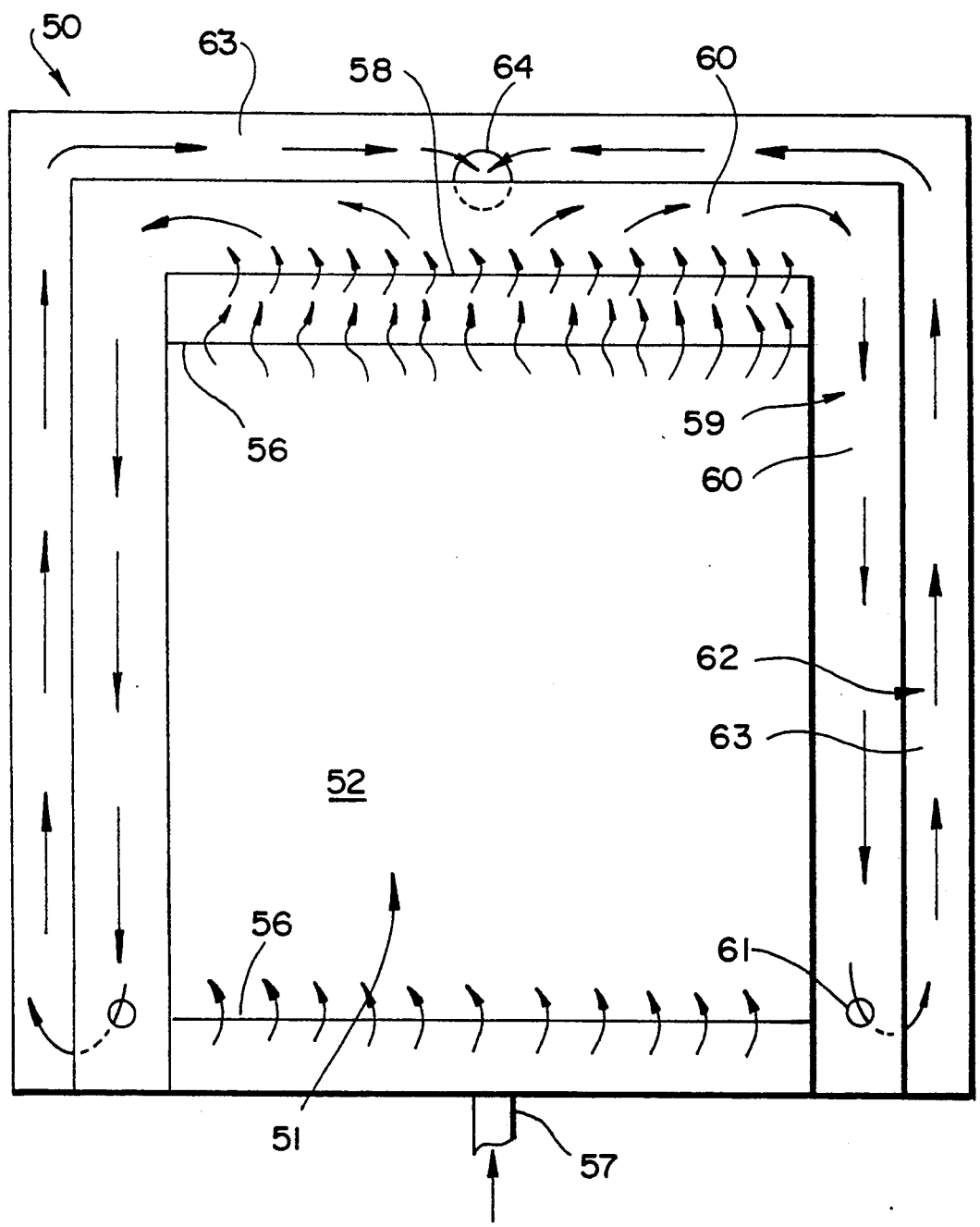
FIG. 13 is a top, plan, schematic diagram of the biological filtration means shown in FIGS. 9-12.
Figure 14:
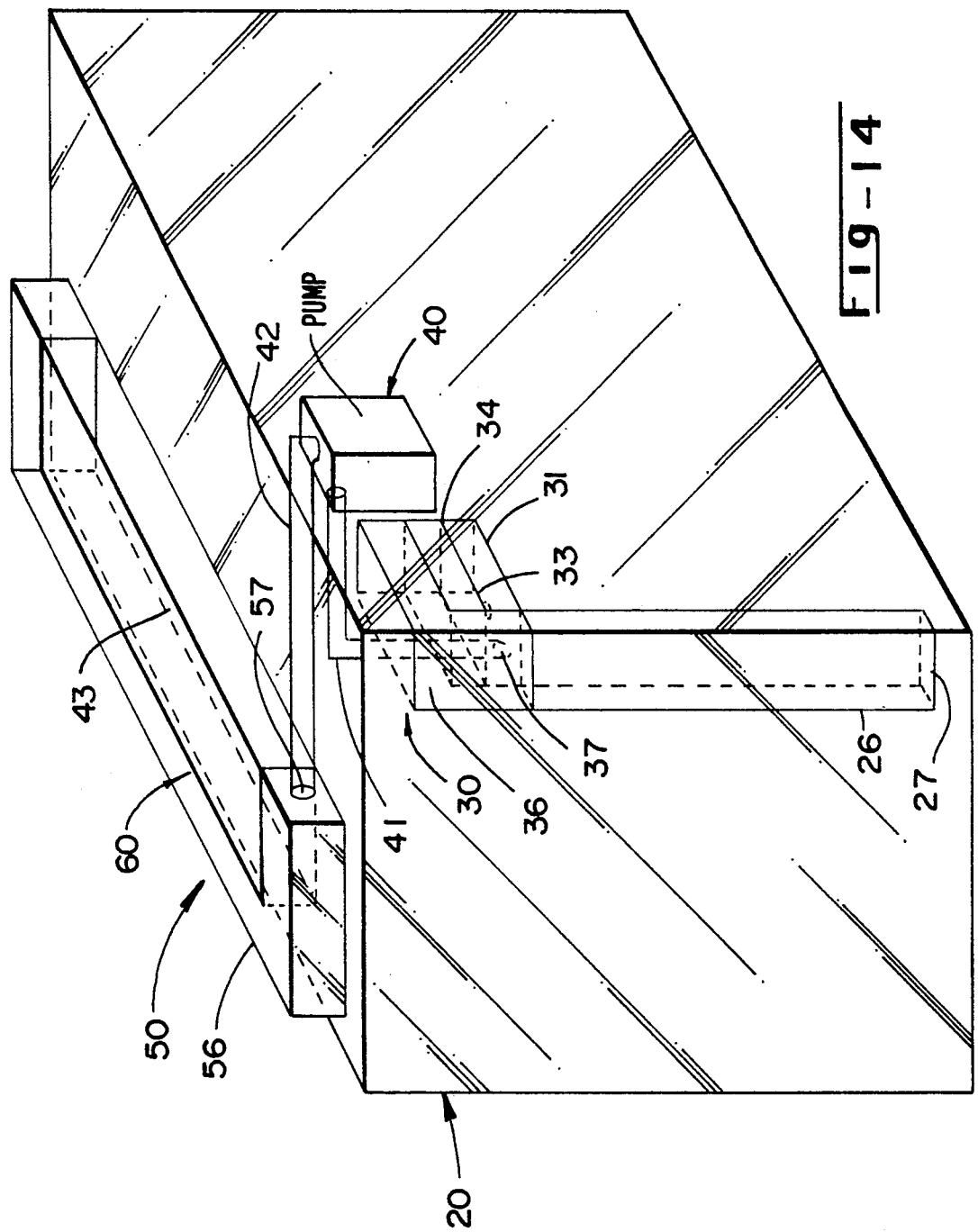
FIG. 14 is a schematic diagram in perspective of a removable filter system and an associated biological filter unit according to the present invention mounted in an aquarium tank.
Figure 15:
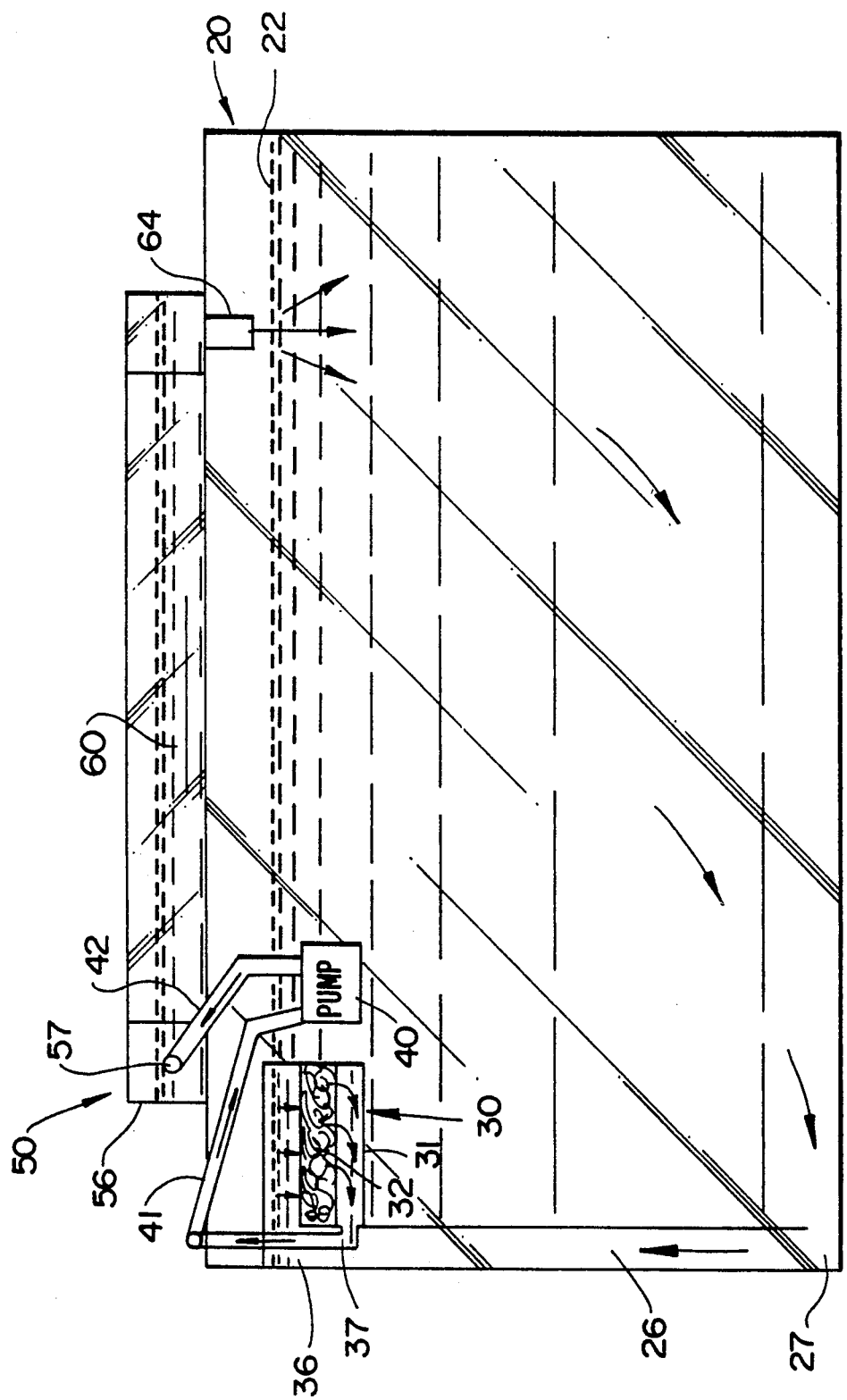
FIG. 15 is a rear, elevational, schematic diagram of the removable filtration system and the associated biological filter mounted in an aquarium tank shown in FIG. 14.
Figure 16:
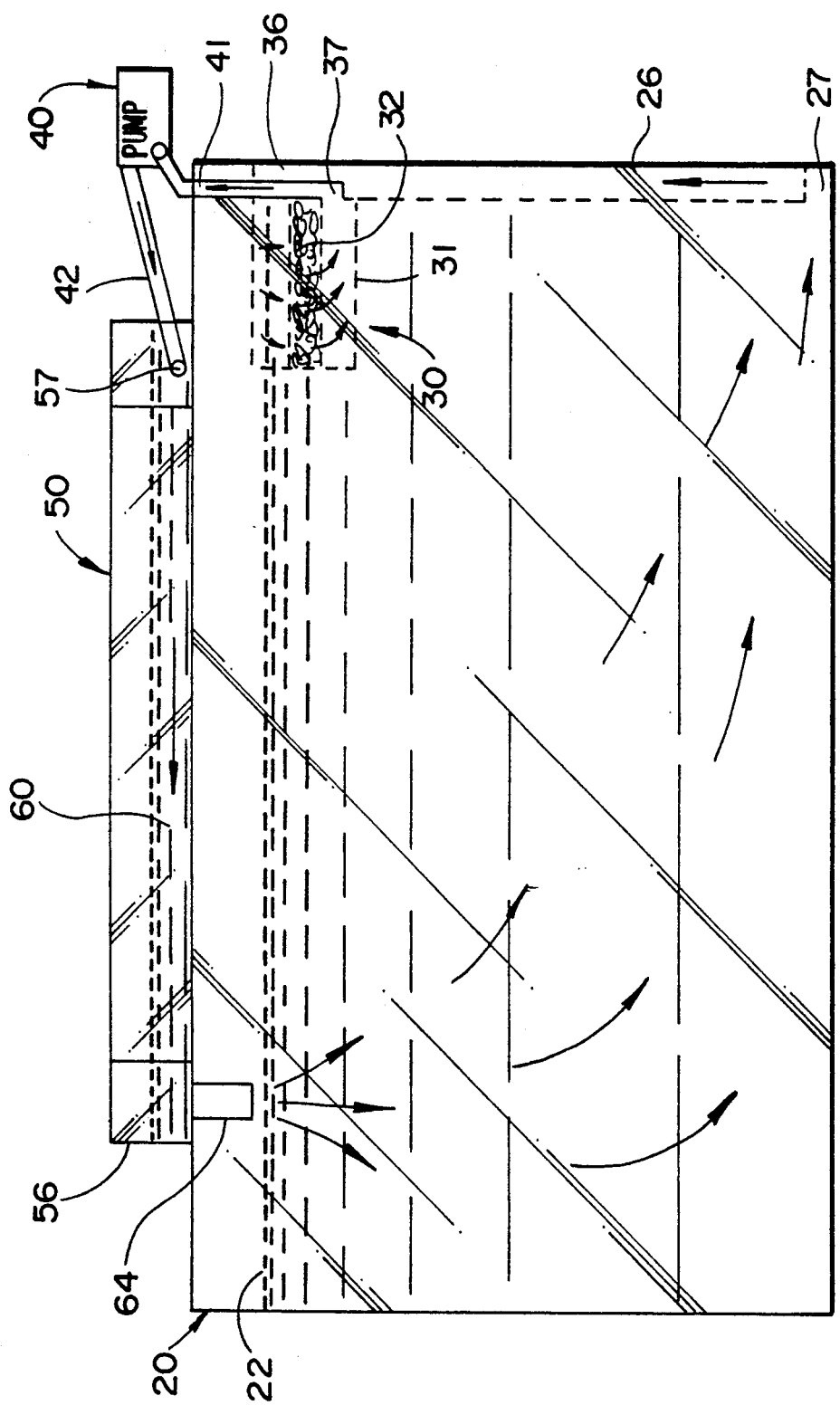
FIG. 16 is a front, elevational, schematic diagram of the removable filtration system and the associated biological filter mounted in an aquarium tank shown in FIG. 14.
Figure 17:
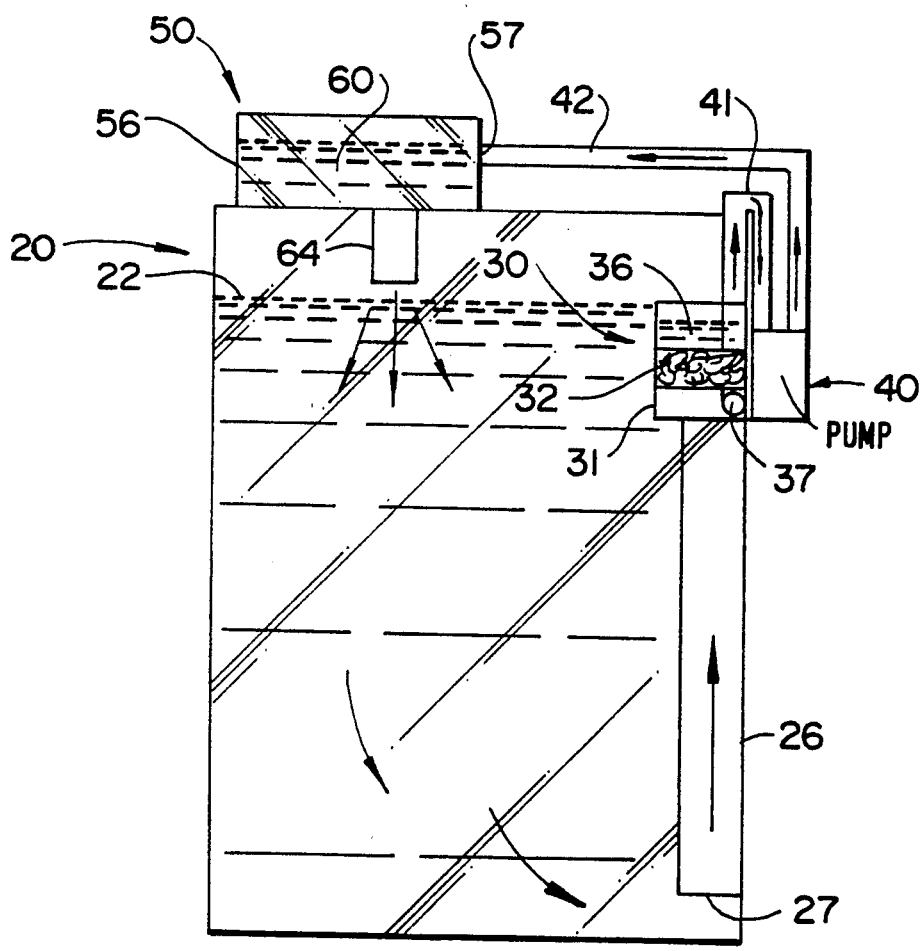
FIG. 17 is a left side, elevational, schematic diagram of the removable filtration system and the associated biological filter mounted in an aquarium tank shown in FIG. 14.
Figure 18:
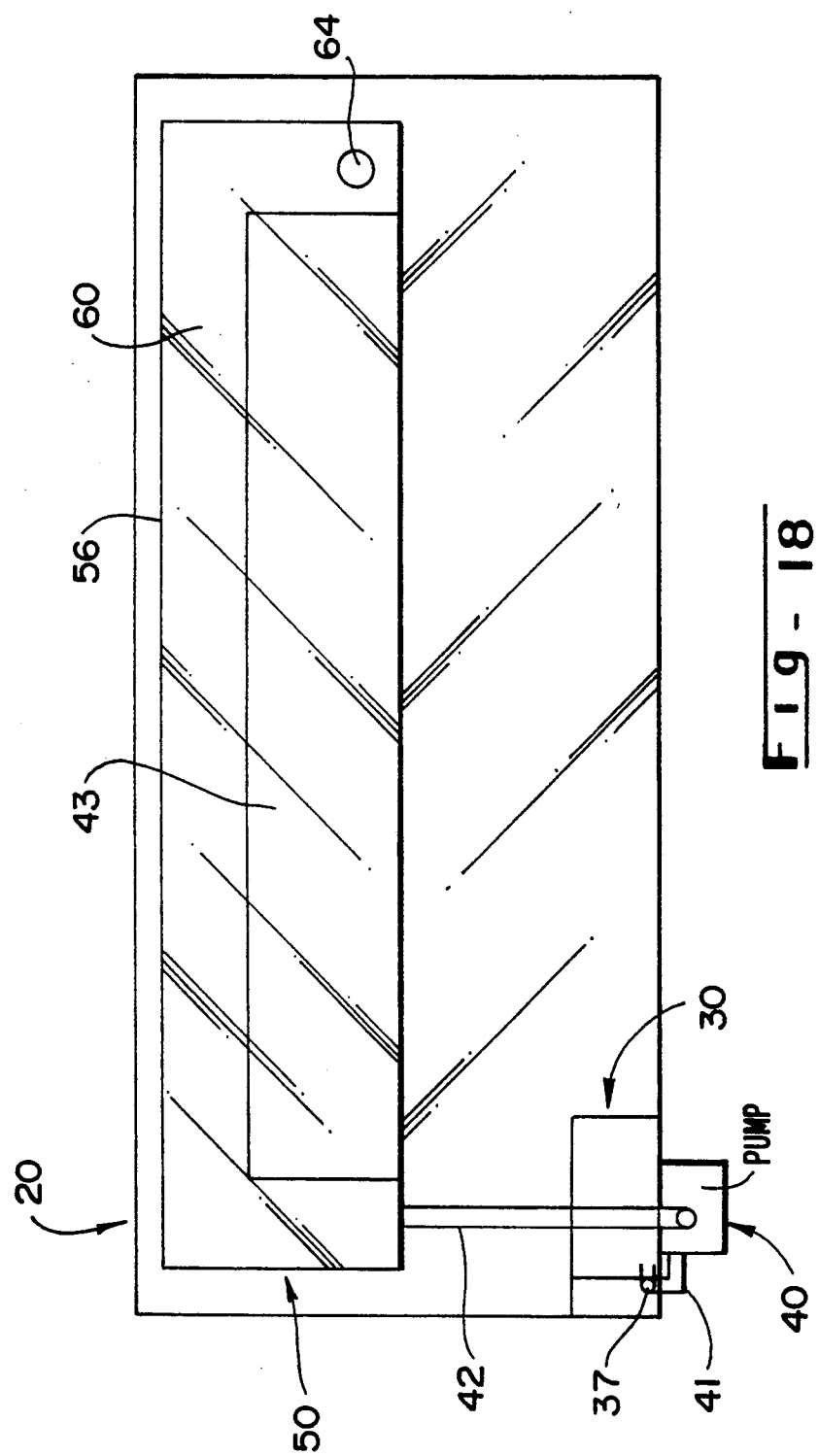
FIG. 18 is a top, plan, schematic diagram of the removable filtration system and the associated biological filter mounted in an aquarium tank shown in FIG. 14.
Figure 19:
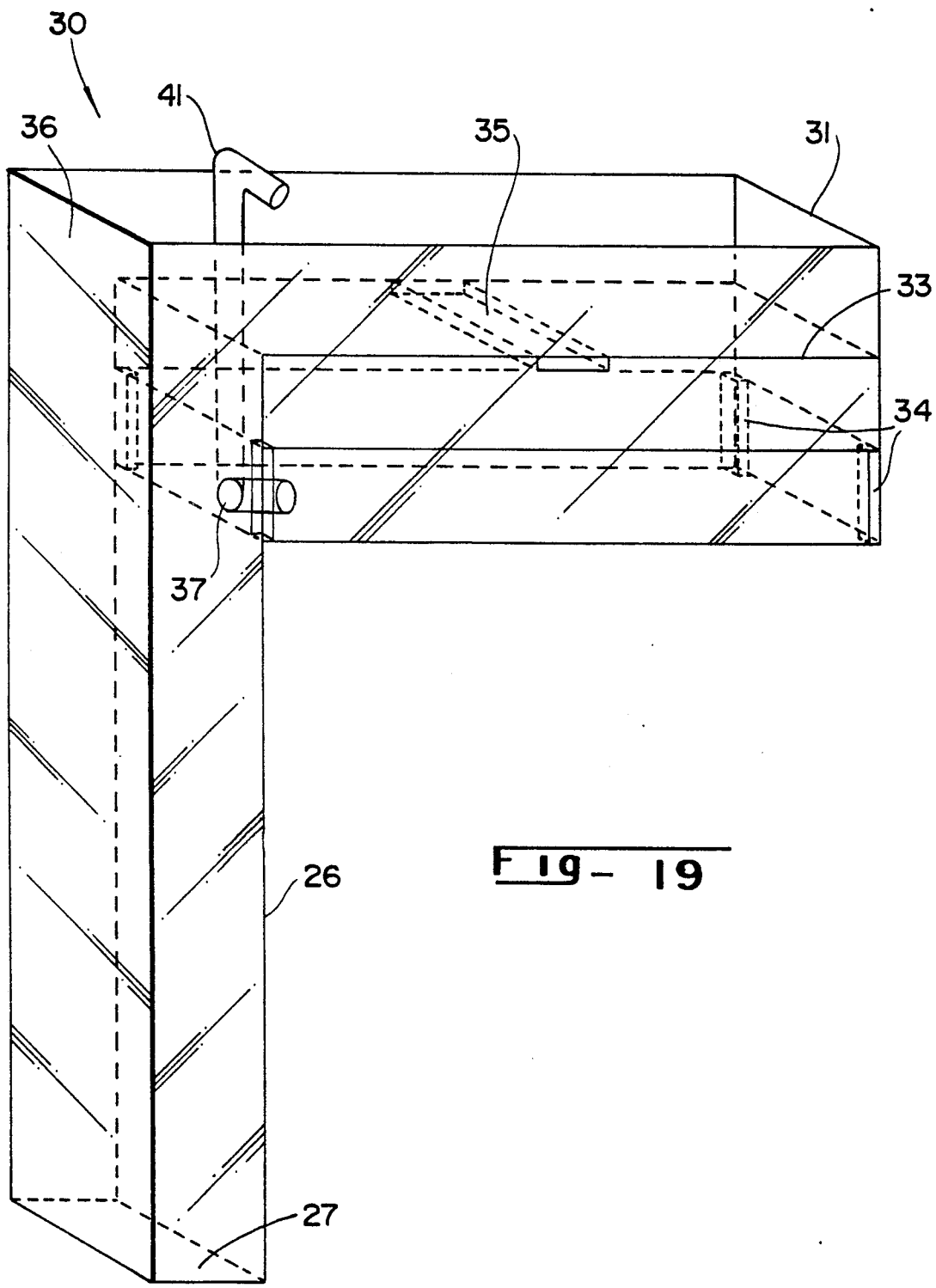
FIG. 19 is a schematic diagram in perspective of the filtration system of the present invention, shown without a pump unit.
Figure 20:
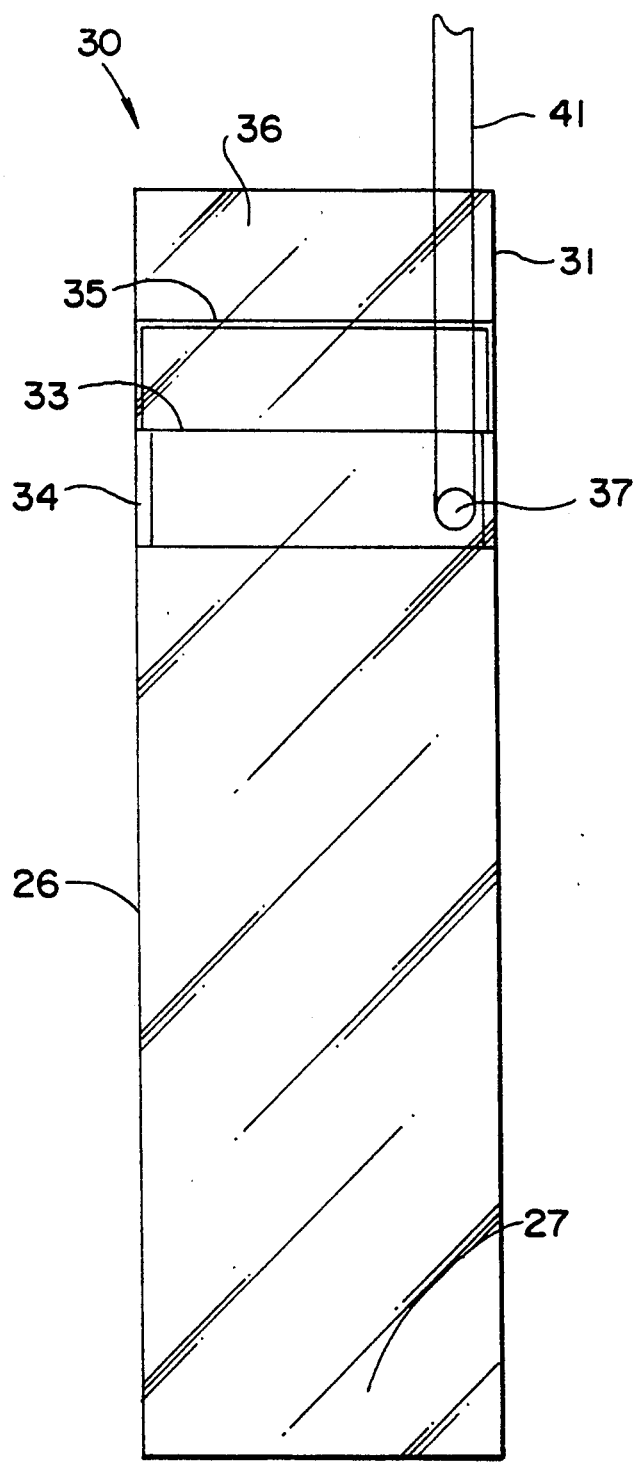
FIG. 20 is a left side, elevational, schematic diagram of the filtration system as shown in FIG. 19.
Figure 21:
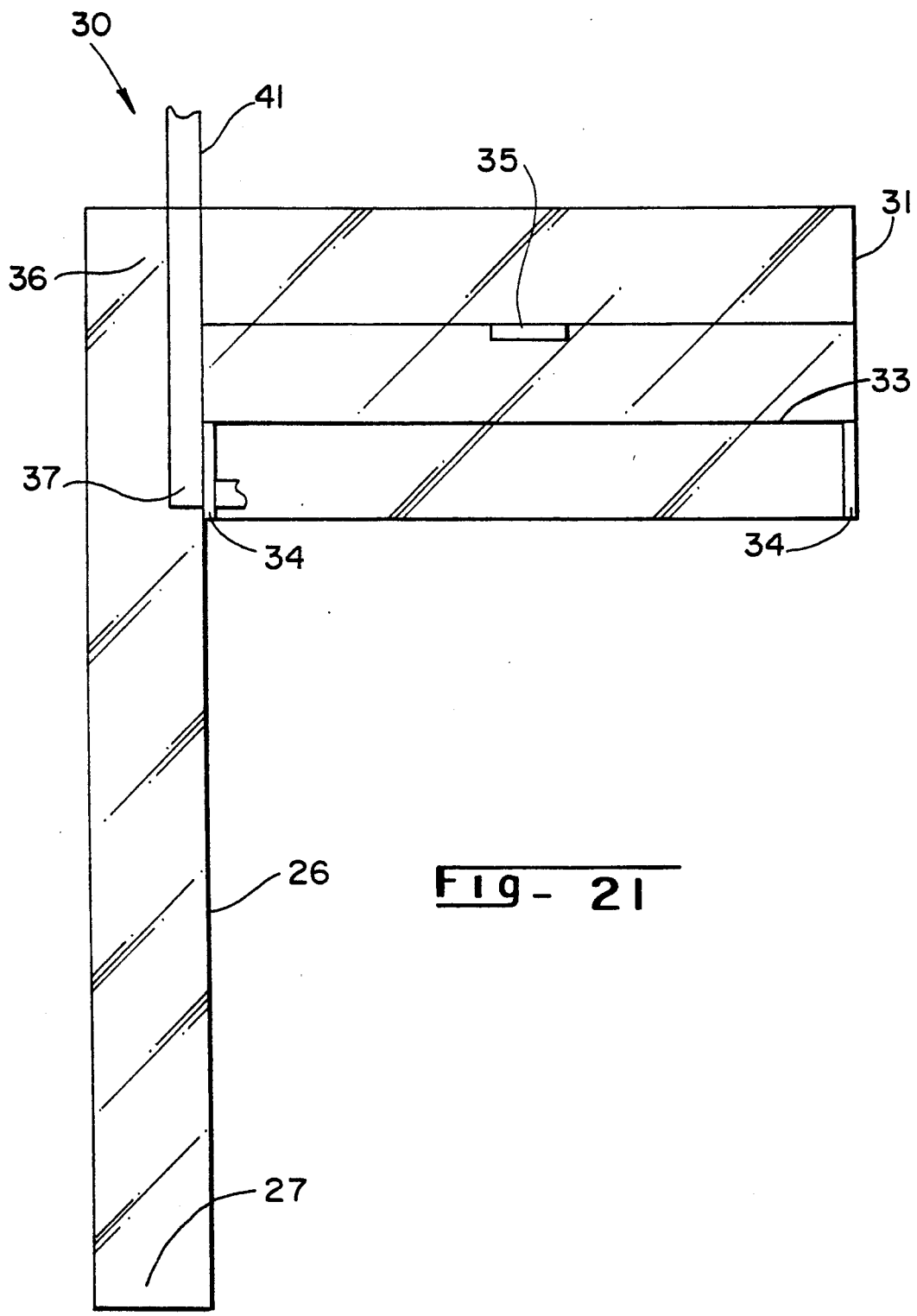
FIG. 21 is a rear, elevational, schematic diagram of the filtration system as shown in FIG. 19.
Figure 22:
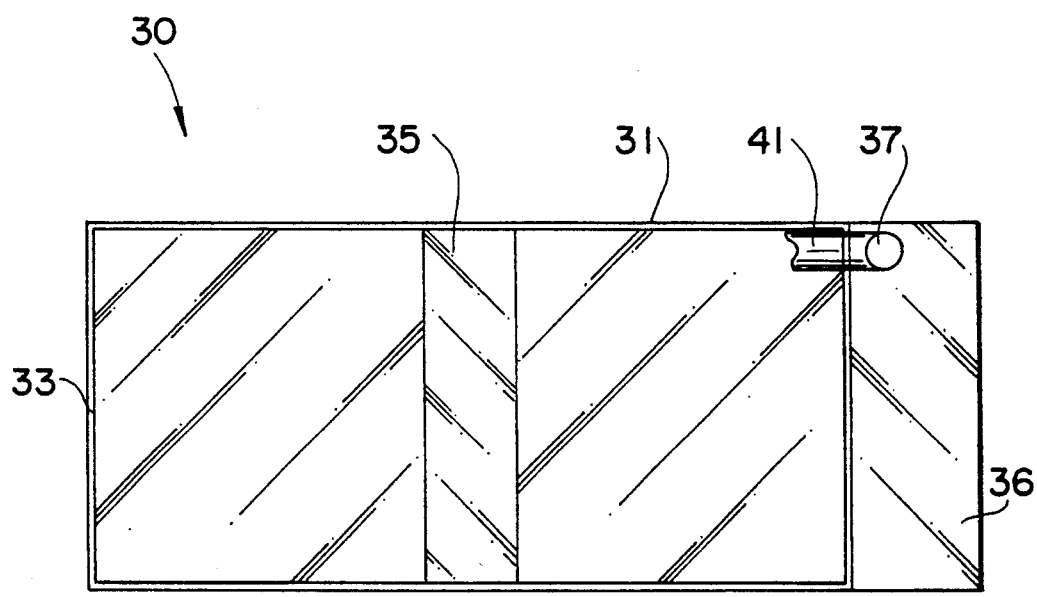
FIG. 22 is a top, plan, schematic diagram of the filtration system as shown in FIG. 19.

In FIGS. 11-13, the flow pattern of the water through the biological filter means 50 through the various units 51, 59 and 62 is shown from different perspectives. These figure drawings show the water flowing over the water fall lip 58, flowing laterally and rearward along water passageway 60 of the intermediate filter unit 59, flowing out of water outlet 61, flowing forward and laterally along the water passageway 63, and flowing out of water outlet 64. In the top, plan view of FIG. 13, the water flow is shown flowing over water containment wall 56 after entering through water inlet 57, through the filter element 52, then under the far water containment wall 56 to flow over the water fall lip 58.

The purpose of the biological filter means is severalfold. A first purpose is to provide a series of water passageways that allows the water to run and simulate conditions of a natural stream. In this connection, small stones and rocks may be placed in the water passageways 60 and 63. The surface areas of the water passageways 60 and 63 provide anchoring for bacteria that helps to cleanse and purify the water as it flows through the water passageway. The addition of stones and rocks in the water passageway further provides surface areas on which bacteria can grow and help to purify the water. A second purpose of the biological filter means is to filter algae by providing surface areas for the algae to become anchored. A third purpose is to allow the water to aerate by virtue of the mixing action as the water flows over the water fall lip 58 and rushes through the water passageways 60 and 63. The aeration further allows toxins in the water to be neutralized by oxidation. Finally, from an aesthetic perspective, the sound of the water flowing through the biological filter means is reminiscent of a natural stream and may provide a soothing sound to the human ear.

The intermediate filter unit 59 may also be adapted to house a light source by means of a hollow within the filter unit.

The water flowing out of the water outlet 64 as well as the water flowing out of water return conduit means 42 carries a certain amount of force as it enters the aquarium tank 20 and contacts the water therein. The force causes a water circulation pattern within the aquarium tank 20 that can be utilized to help direct debris and waste towards the water drain outlet 21. For example, the placement of the water return conduit means 42 in the middle towards the rear of the aquarium tank 20 will cause a water circulation pattern that flows down towards the upper end 24 of the slanted bottom 23, down the slanted bottom 23 towards the lower end 25 of the slanted bottom and towards the water drain outlet 21. This flow pattern will assist in urging debris and waste on the slanted bottom 23 towards the water drain outlet 21. With respect to the water outlet 64 of the lower filter unit 62, this outlet can also be modified by the addition of further water passageways so that the water flows out into the aquarium tank in the rear of the aquarium tank to cause a water flow pattern similar to the water circulation pattern described above. As noted previously, the aquarium tank 20 may be formed either with a slanted bottom or a flat, horizontal bottom.

Turning now to FIGS. 14-22, a removable water filter system 30 is shown in conjunction with an associated biological filter unit 50. The water filter system 30 comprises a water containment housing 30 having a water inlet 36 and a water outlet 37. The water containment housing is mounted on a wall of the aquarium 20, inside the aquarium, and extends both above and below a water fill line 22 of the aquarium tank 20. A water pumping means 40 may also be mounted on a wall of the aquarium 20, but outside of the interior of the aquarium. A water drain conduit 26 having a predetermined length is provided integral to the water containment housing 30, extends above the water fill line 22, and communicates with the water inlet 36.

In the water containment housing 30, the water inlet 36 is positioned above the water outlet 37 with a filter element 32 removably positioned between the water inlet 36 and the water outlet 37 within the water containment housing 30. The water drain conduit 26 extends downwardly towards the bottom of the aquarium and ends at a water intake 27 just above the bottom of the aquarium 20, preferably between about $\frac{1}{4}$ inch to 1 inch from the bottom of the aquarium tank. The water outlet 37 of the water containment housing 30 communicates with the water pump 40 by a water conduit means 41, and the water pumping means 40 has a water return conduit means 42 for pumping water into aquarium 20 or for communicating with a water inlet 57 of a biological filter unit 50.

As previously described, the water containment housing 30 is adjacent to and extends both above and below the water fill line 22 of the aquarium 20, and the water inlet 36 is at or below the water fill line 22 of the aquarium 20. In order to allow maximum flexibility and adaptability to the various depths of different types of aquarium tanks, the water drain conduit 26 is provided with an adjustable length, e.g., via telescopic length, snap-fit add-ons, or cut-to-length, etc., so that the filter system can be used with virtually any type of aquarium tank regardless of the depth of the aquarium tank.

The filter element 32 is removably contained in a removable filter element housing 33. The filter element housing 33 rests on filter element housing supports 34 provided within the water containment housing 31. The supports 34 allow the removable filter element housing 33 to rest at an intermediate level within the water containment housing 31 such that a layer of water exists both above and below the filter element housing 33. Although it is not critical where the filter element housing 33 is located within the water containment housing 31, it is critical that the filter element housing 33 be positioned between the water inlet 36 and the water outlet 37.

The water inlet 36 is in the form of a lowered common wall portion between the water containment housing 31 and the water drain conduit 26. So long as the water fill line 22 is above the level of this lowered common wall portion, the flow pattern of the water through the filter system will not be disrupted or broken.

The biological filter unit 50, as stated previously, simply provides a water passageway that allows the water to run and simulate conditions of a natural stream. The water passageway is preferably open to the air, and the interior surface of the walls of the water passageway provides anchoring for bacteria that help to cleanse and purify the water as it flows through the water passageway. The interior surface of the walls of the passageway also filters algae from the passing water by providing an anchor for the algae. Additionally, the running of water through the passageway of the biological filter unit allows the water to aerate, thereby also neutralizing toxins in the water.

The biological filter unit 50 shown in FIGS. 14-18, comprises water containment walls 56, a water inlet 57 and a water outlet 61. It is mounted on top of the aquarium tank 20 using the side walls of the aquarium tank as supports. The biological filter unit 50 may further comprise a housing 43 for a light source. The housing is formed by the water containment walls 56.

It is preferable to locate the water outlet 64 distant to the water intake 27 of the water drain conduit 26, preferably at opposite ends of the aquarium tank 20. Such a configuration allows the creation of a water flow or circulation pattern within the aquarium tank that directs debris and wastes in the water of the aquarium tank towards the water intake 27 where they are urged up through the water drain conduit means 26 and filtered by the filtering means 30, and then pumped back into the aquarium tank 20 by the pumping means 40 either directly or through the biological filtration means 50.

It will be apparent to those skilled in the art that various modifications and variations can be made in the method and apparatus of the present invention and in the construction of this apparatus without departing from the scope or spirit of the invention. As an example, the aquarium tank 20 can be of any shape and configuration and have multiply slanted bottom walls converging on a water drain outlet. In the case of an extremely wide aquarium tank, the bottom wall could comprise a first slanted bottom that slants towards the front of the aquarium tank and drops off onto a second slanted bottom that slants towards one side of the aquarium tank with a water drain outlet located at the lower end of the second slanted bottom. In the case of an octagonal tank or a circular tank, the bottom could be frusto-conical with a water drain outlet located in the center of the frusto-conical bottom. Moreover, multiple water drain outlets may be employed in conjunction with multiple slanted bottoms with multiple filter means and multiple biological filter means.

The biological filter means can be made to have a fanciful water passageway configuration comprising both open and closed water passageways. Greater total length of the water passageway of the biological filter means would allow greater aeration and purifying action on water passing therethrough.

Other embodiments of the invention will be apparent to those skilled in the art from consideration of the specification and practice of the invention disclosed herein. It is intended that the specification and embodiments described therein be considered as exemplary only, with true scope and spirit of the invention being indicated by the following claims.

What is claimed is:

1. A method for maintaining an artificial aquatic environment for supporting aquatic organisms comprising:
    forming a water tank having a water drain outlet on a bottom wall of the water tank and having a water fill line;
    providing a water filter means adjacent the water fill line of the water tank, the water filter means having a water containment housing with a water inlet and a water outlet, the water containment housing extending above and below the water fill line of the water tank, the water inlet being positioned higher than the water outlet, the water inlet being positioned at or below the water fill line of the water tank, a filter element removably provided between the water inlet and the water outlet within the water containment housing;
    connecting the water drain outlet to the water filter means with a water drain conduit means such that the water filter means and the water tank have a common water line when the water tank is filled with water to the water fill line;
    providing an open air biological filter means above the water tank, the biological filter means having a water inlet and a water outlet, the biological filter means having a removable filter element between its water inlet and water outlet, the water outlet of the biological filter means communicating with the water tank from above the water tank;
    providing a water pumping means having a water inlet and a water outlet adjacent the water containment housing;
    connecting the water outlet of the water filter means to the water inlet of the water pumping means with a water conduit means; and
    connecting the water outlet of the water pumping means to the water inlet of the biological filter means with a water return conduit means;
    whereby when the water pumping means is activated, water in the water tank together with debris and waste in the water tank is forced through the water drain outlet by water pressure within the water tank, travels through the water drain conduit means to the water filter means where the water is filtered to remove the debris and waste, then pumped by water pumping means through the water return conduit means to the biological filter means, flows through the biological filter means by force of gravity and returned to the water tank through the water outlet of the biological filter means.

2. A method for maintaining an artificial aquatic environment for supporting aquatic organisms according to claim 1, wherein the water tank is formed with a slanted bottom and the water drain outlet is located at a lower end of the slanted bottom.

3. A method for maintaining an artificial aquatic environment for supporting aquatic organisms according to claim 1, wherein the water filter means is provided exterior of the water tank.

4. A method for maintaining an artificial aquatic environment for supporting aquatic organisms according to claim 1, wherein the water filter means is provided within the interior of the water tank.

5. A method for maintaining an artificial aquatic environment for supporting aquatic organisms according to claim 1, wherein the filter element of the water filter means is removably contained in a removable filter element housing.

6. A method for maintaining an artificial aquatic environment for supporting aquatic organisms according to claim 1, wherein the filter element of the biological filter means is removably contained in a removable filter element housing.

7. An aquarium system comprising:
  a water tank having a water drain outlet located on a bottom wall of the water tank and having a water fill line;
  a water filter means provided adjacent a water fill line of the water tank, the water filter means having a water containment housing with a water inlet and a water outlet, the water containment housing extending above and below the water line of the water tank, the water inlet being positioned higher than the water outlet, the water inlet being positioned at or below the water fill line of the water tank, a filter element removably positioned between the water inlet and the water outlet within the water containment housing;
  an open air biological filter means provided above the water tank and having a water inlet and a water outlet with a filer element removably provided between the water inlet and water outlet, the water outlet of the biological filter means communicating with the water tank from above the water tank;
  a water pumping means having a water inlet and a water outlet provided adjacent the water containment housing;
  a water drain conduit means connecting the water drain outlet with the water inlet of the water containment housing such that the water tank and the water containment housing share a common water line when the water tank is filled with water to the water fill line;
  a water conduit means connecting the water outlet of the water containment housing with the water inlet of the water pumping means; and
  a water return conduit means connecting the water outlet of the water pumping means with the water inlet of the biological filter means.

8. The aquarium system as claimed in claim 7, wherein the water tank is formed with a slanted bottom and the water drain outlet is located at a lower end of the slanted bottom.

9. The aquarium system as claimed in claim 7, wherein the water filter means is provided exterior of the water tank.

10. The aquarium system as claimed in claim 7, wherein the water filter means is provided within the interior of the water tank.

11. The aquarium system as claimed in claim 7, wherein the filter element is removably contained in a removable filter element housing.

12. The aquarium system as claimed in claim 7, wherein the filter element of the biological filter means is removably contained in a removable filter element housing.

* * * * *